United States Patent

Nagato

[11] Patent Number: 5,875,244
[45] Date of Patent: Feb. 23, 1999

[54] TRANSMISSION APPARATUS FOR RELAYING DIFFERENT TYPES OF TRUNK SIGNALS

[75] Inventor: Takashi Nagato, Kawasaki, Japan

[73] Assignee: Fujitsu Limited, Kanagawa, Japan

[21] Appl. No.: 674,852

[22] Filed: Jul. 3, 1996

Related U.S. Application Data

[63] Continuation of Ser. No. 371,423, Jan. 11, 1995, abandoned.

[30] Foreign Application Priority Data

Mar. 18, 1994 [JP] Japan .................................. 6-049582

[51] Int. Cl.$^6$ .......................... H04M 7/00; G08C 19/00; H04J 15/00
[52] U.S. Cl. .................... 379/229; 340/825.63; 370/212; 375/238; 379/237; 379/240; 455/403; 455/554
[58] Field of Search ................................. 379/220, 219, 379/58, 59, 221, 229, 235, 236, 237, 240; 370/9, 212; 375/238; 340/825.63; 455/403, 405, 422, 444, 554

[56] References Cited

U.S. PATENT DOCUMENTS

| | | | |
|---|---|---|---|
| 3,804,991 | 4/1974 | Hammond | 379/222 |
| 3,859,474 | 1/1975 | Gueldenpfennig | 379/244 X |
| 4,002,850 | 1/1977 | Richards | 379/234 |
| 4,636,584 | 1/1987 | Binkerd | 379/240 |
| 4,776,036 | 10/1988 | Hulsey et al. | 375/238 X |
| 5,173,933 | 12/1992 | Jabs et al. | 455/405 |
| 5,504,802 | 4/1996 | Kennedy et al. | 455/427 |
| 5,666,398 | 9/1997 | Schiffel et al. | 455/403 X |

FOREIGN PATENT DOCUMENTS

| | | |
|---|---|---|
| 54-071908 | 6/1979 | Japan . |
| 55-088491 | 7/1980 | Japan . |
| 63-187857 | 8/1988 | Japan . |

Primary Examiner—Harry S. Hong
Attorney, Agent, or Firm—Staas & Halsey

[57] ABSTRACT

A transmission apparatus for relaying different types of trunk signals, including a central processing unit including a reception counter processor which is inserted between a pair of exchanges and enables direct relay of exchange trunk signals (Sxt) and analog trunk signals (Sem) of a pulse ear and mouth (E&M) mode on a radio transmission line by counting the pulse width of the signals (Sem) and determining their type, a transmission counter processor which transmits the pulse E&M signals until the count of the pulse width inherent to the signals Sem corresponding to the signals Sxt is finished, and a logical operation unit which generates the corresponding signals Sxt based on the result of determination of the reception counter processor and drives the transmission counter processor based on the input signals Sxt, whereby it is possible to give an existing digital transmission apparatus handling E&M signals a function corresponding to a conventional higher rank exchange.

8 Claims, 20 Drawing Sheets

Fig.6

| CLASSIFICATION OF ANALOG TRUNK SIGNALS | DIRECTION | O/G SIDE 4W E&M | | TS-16 LINE CODE | | | | | | | | I/C SIDE 4W E&M | |
|---|---|---|---|---|---|---|---|---|---|---|---|---|---|
| | | E & M INTERFACE | | | | | | | | | | E & M INTERFACE | |
| | | M-DETECTION | E-DRIVE | af | bf | cf | df | ab | bb | cb | db | E-DETECTION | M-DRIVE |
| Idle | ↑ | — | — | 1 | 0 | 0 | 1 | 1 | 0 | 0 | 1 | — | — |
| Seized | ↓ | 40 G | — | 0/0 | 0 | 0 | 1 | 1 | 0 | 0 | 1 | — | — |
| Seized acknowledge | ↓ | — | 150 G / 350 G | 0 | 0 | 0 | 1 | 1 | 1 | 0 | 1 | 40 G | 150 G / 350 G |
| Answer | ↑ | — | — | 0 | 0 | 0 | 1 | 0/1 | 1 | 0 | 1 | — | — |
| DP Addressing | ↓ | 40 G | — | 0/1 | 0 | 0 | 1 | 1 | 1 | 0 | 1 | — | — |
| Clear back | ↑ | — | 350 G | 0 | 0 | 0 | 1 | 1 | 1 | 0 | 1 | 40 G | 350 G |
| Clear forward | ↓ | 950 G | — | 1/1 | 0 | 0 | 1 | 1 | 1 | * | 1 | 950 G | — |
| Blocking | ↓ | — | CONTG | 0 | 0 | 0 | 1 | * | * | * | 1 | — | CONTG |
| Metering pulse | ↑ | — | 120 G | 1 | 0 | 0 | 1 | 1 | 1/0 | 0 | 1 | — | 120 G |
| Release guard | ↓ | — | 150 G | 0 | 0 | 0 | 1 | 0/1 | 1/0 | 0/1 | 1 | — | 150 G |
| Trunk offering | ↑ | 60 G | — | 1 | 0 | 0 | 1 | 1 | 1 | 0 | 1 | 60 G | — |
| End of Selection | ↓ | — | 120 G | 0 | 0 | 0 | 1 | 1 | 1 | 0 | 1 | — | 120 G |
| Proceed to Send | ↓ | — | 140 G | 0 | 0 | 0 | 1 | 1 | 1 | 0 | 1 | — | 140 G |
| Malicious call | ↓ | — | 150 G | 0 | 0 | 0 | 1 | 0/0 | 0/0 | 0/0 | 1 | — | 150 G |
| Congestion | ↓ | — | 950 G | 0 | 0 | 0 | 1 | 0/0 | 0/0 | 0/1 | 1 | — | 950 G |
| Operator recall | ↓ | — | 60 G | 0 | 0 | 0 | 1 | 0/1 | 0/1 | 1/0 | 1 | — | 60 G |

Fig. 7

| CLASSIFICATION OF ANALOG TRUNK SIGNALS | PULSED E & M INTERFACE SIDE | | 3-BIT FORMAT (DIGITAL) SIDE | |
|---|---|---|---|---|
| | DETECTION TIME LENGTH (msec) | SENDING PULSE WIDTH (msec) | DETECTION TIME LENGTH (msec) | SENDING PULSE WIDTH (msec) |
| Siezed | 40 ± 5 | 40 ± 5 | | |
| Siezed acknowledge | 150 ± 30 | 150 ± 5 | | |
| Answer | 350 ± 70 | 350 ± 5 | | |
| DP Addressing | 40 ± 5 | 40 ± 5 | | |
| Clear back | 350 ± 70 | 350 ± 5 | | |
| Clear forward | 950 ± 200 | 950 ± 5 | 60 ± 5 | 60 ± 5 |
| Blocking | >1150 | continious | | |
| Metering pulse | 120 ± 25 | 120 ± 5 | 120 ± 30 | 125 ± 5 |
| Release guard | 150 ± 30 | 150 ± 5 | | |
| Trunk offering | 60 ± 10 | 60 ± 5 | | |
| End of Selection | 120 ± 20 | 120 ± 5 | 120 ± 10 | 125 ± 5 |
| Proceed to Send | 140 ± 20 | 140 ± 5 | 150 ± 30 | 150 ± 5 |
| Malicious call | 150 ± 30 | 150 ± 5 | | |
| Congestion | 950 ± 200 | 950 ± 5 | | |
| Operator recall | 60 ± 5 | 60 ± 5 | 60 ± 5 | 60 ± 5 |

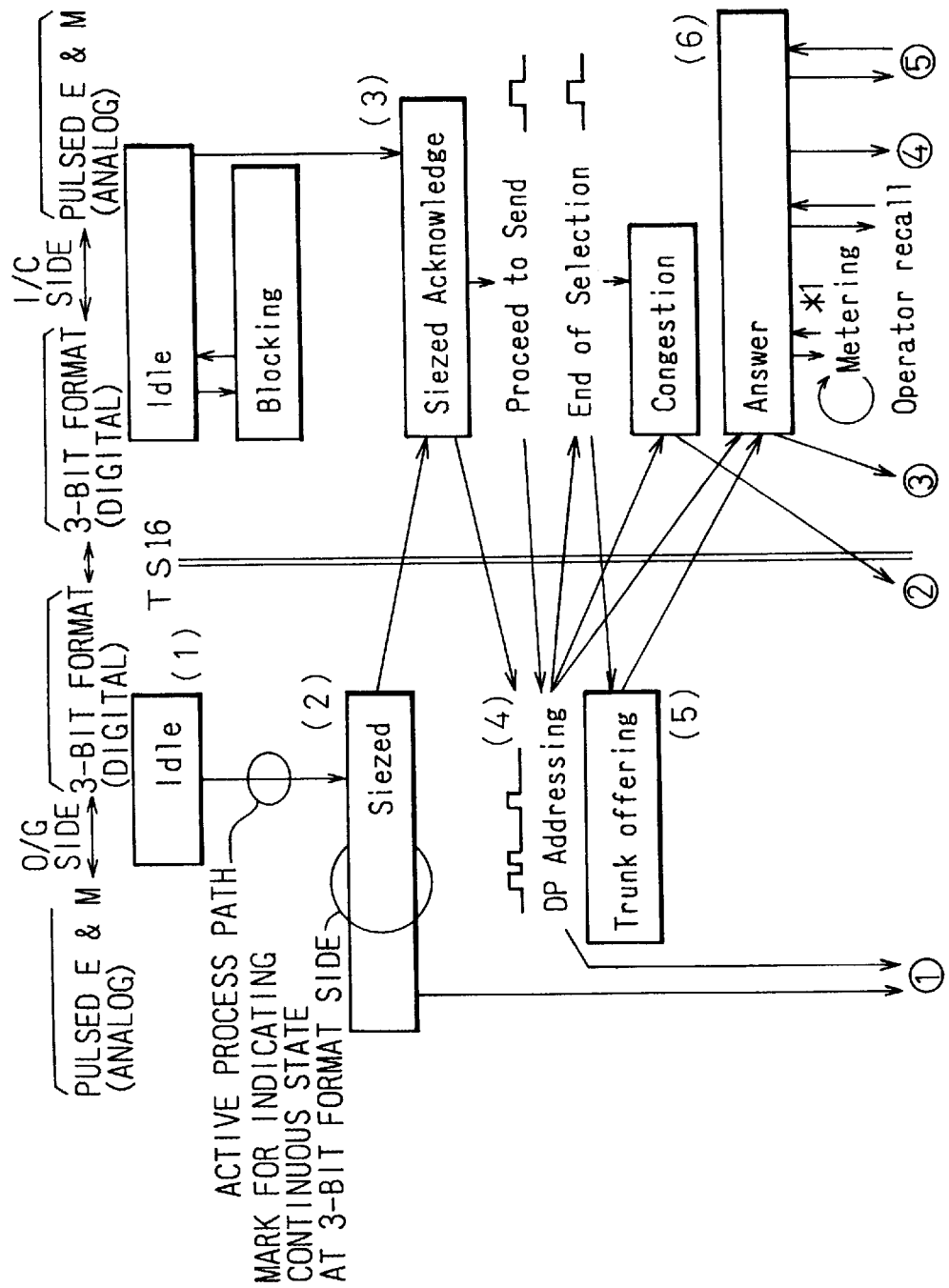

5,875,244

TRANSMISSION APPARATUS FOR RELAYING DIFFERENT TYPES OF TRUNK SIGNALS

This application is a continuation of application Ser. No. 08/371,423, filed Jan. 11, 1995, now abandoned.

BACKGROUND OF THE INVENTION

1. Field of the Invention

The present invention relates to a digital transmission apparatus which is able to relay different types of trunk signals, for example, a digital transmission apparatus which directly relays exchange trunk signals and pulse "ear and mouth" (E&M) signals.

The trunks provided at the input and output ports of exchanges are essential components in the interfaces for connecting one exchange with another. A digital transmission apparatus is inserted between the trunks of one exchange and the trunks of the other exchange for actual connection of the same. One such transmission apparatus is the one known as a "PCM30", which for example functions to multiplex, demultiplex, and transmit 30 channels' worth of signals. The present invention relates to a functional facility used in such a digital transmission apparatus, that is, a transmission apparatus for relaying different types of trunk signals.

2. Description of the Related Art

As will be explained in further detail later referring to the drawings, a general telephone network includes a plurality of so-called "subscriber side exchanges", i.e., lower rank exchanges each having a plurality of subscriber terminals under them connected by subscriber circuits.

These lower rank exchanges connect to subscriber terminals of other lower rank exchanges through higher rank exchanges called "regional centers (RC)". Such higher rank exchanges RC are constructed at respective regions. When establishing an intra-city route connecting one higher rank exchange RC with another over a steep mountain or dense jungle, the two higher rank exchanges RC are connected to each other through radio stations.

To enable transfer of trunk signals between one lower rank exchange and another through a pair of radio stations in such a network configuration, it is necessary to use two different types of signals, that is, the digital trunk signals of the exchange trunk signals ($S_{xt}$) and the analog trunk signals of the pulse E&M signals ($Se_m$).

The transfer of information among these two completely different types of trunk signals, i.e., the exchange trunk signals $S_{xt}$ and pulse E&M signals $Se_m$, is possible due to the higher rank exchanges RC, which serve as interfaces between these signals. Without such higher rank exchanges RC, relaying between these different types of trunk signals has not been possible. Therefore, there was the problem that large sized facilities were required, which pushed up line costs.

SUMMARY OF THE INVENTION

Accordingly, in consideration of the above problem, the object of the present invention is to provide a transmission apparatus for relaying different types of trunk signals which can directly relay exchange trunk signals ($S_xt$) and pulse E&M signals $Se_m$ without the assistance of a large-sized facility corresponding to a higher rank exchange.

To attain the above object, the present invention provides a transmission apparatus for relaying different types of trunk signals comprising a central processing unit comprised of a reception counter processing means which is inserted between a pair of exchanges and enables direct relay of exchange trunk signals $S_{xt}$ and analog trunk signals $Se_m$ of a pulse E&M mode on a radio transmission line by counting the pulse width of the signals Sem and determining their type, a transmission counter processing means which transmits the pulse E&M signals until the count of the pulse width inherent to the signals Sem corresponding to the signals $S_xt$ is finished, and a logical operation unit which produces the corresponding signals $S_{xt}$ based on the result of determination of the reception counter processing means and drives the transmission counter processing means based on the input signals $S_xt$, whereby it is possible to give an existing digital transmission apparatus handling E&M signals a function corresponding to a conventional higher rank exchange.

BRIEF DESCRIPTION OF THE DRAWINGS

The above object and features of the present invention will be more apparent from the following description of the preferred embodiments with reference to the accompanying drawings, wherein:

FIG. 6 is a correspondence table between digital exchange trunk signals and pulse E&M signals;

FIG. 7 is a view of the accuracies demanded by signals shown in the correspondence table of FIG. 6;

FIG. 8 is a sequence chart (part 1) showing the transfer of various types of signals shown in FIG. 6;

DESCRIPTION OF THE PREFERRED EMBODIMENTS

Before describing the embodiments of the present invention, the related art and the disadvantages therein will be described with reference to the related figures.

Figure 20:
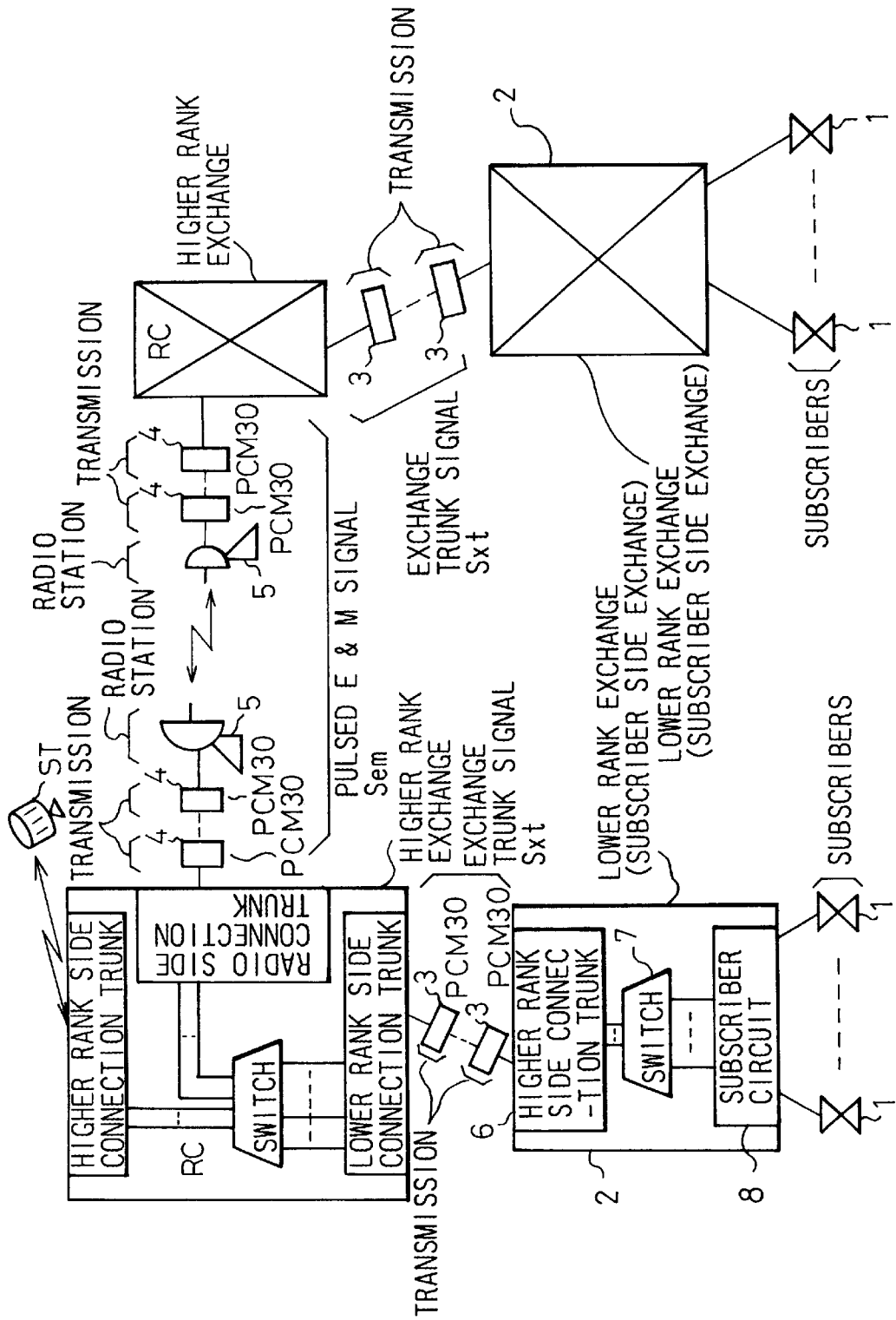
FIG. 20 is a view of the configuration of a general telephone network in the related art.

FIG. 20 is a view of the configuration of a general telephone network of the related art. Referring to the left side of the figure, there are a plurality of so-called "subscriber side exchanges" (only one shown in the figure for simplification of the illustration), i.e., lower rank exchanges 2, each having a plurality of subscriber terminals under them connected by subscriber circuits 8.

These lower rank exchanges 2 are connected to other subscriber terminals of other lower rank exchanges through higher rank exchanges RC. Such higher rank exchanges RC are constructed at respective regions. When establishing an intra-city route connecting one higher rank exchange RC with another over a steep mountain or dense jungle, the two higher rank exchanges RC are connected to each other through radio stations 5. In the case of international lines, the higher rank exchanges are connected via a satellite ST.

Lines switched by a switch 7 in a lower rank exchange 2 are connected through a higher rank side connection trunk 6 and a lower rank side connection trunk of the higher rank exchange RC to a radio station 5 or satellite ST.

In FIG. 20, the portion relevant to the present invention is the transmission apparatus 4 at the radio station. The transmission apparatus 3 at the higher rank exchange RC is connected through the lower rank side connection trunk and switch in the higher rank exchange RC to the radio side connection trunk.

On the other hand, the transmission apparatus 4 at the radio station 5 is connected through the radio side connection trunk to the radio station 5 and, further, is connected through the other radio station 5 (right side of FIG. 20), the other transmission apparatus 4, the other higher rank exchange RC, and the other higher rank exchange transmission apparatus 3 to the other lower rank exchange 2 accommodating the other subscriber terminal 1.

Here, looking at the signaling signals transferred between one lower rank exchange 2 (left side in figure) and the other lower rank exchange 2 (right side in figure), the signaling signal transferred between the trunks of the lower rank exchange 2 and the higher rank exchange RC is the exchange trunk signal $S_{xt}$. Further, the signaling signal (analog signal) transferred between the radio side connection trunks of the two higher rank exchanges RC is the pulse E&M signal (pulsed ear and mouth signals). M refers to the transmission side, and E the reception side. The sequence is of reception and then return of signals. The same applies to the transfer of signals by the so-called SS/SR mode.

In the final analysis, to enable transfer of trunk signals between one lower rank exchange 2 and another through a pair of radio stations 5, it is necessary to use two different types of signals, that is, the digital trunk signals of the exchange trunk signals $S_{xt}$ and the analog trunk signals of the pulse E&M signals $Se_m$.

The transfer of information among these two completely different types of trunk signals, i.e., the exchange trunk signals $S_xt$ and pulse E&M signals Sem, is possible due to the intervention of the higher rank exchanges RC serving as the interfaces between these signals. Without such higher rank exchanges RC, relaying between these different types of trunk signals has not been possible. Therefore, there has been the above-mentioned problem that large sized facilities are required, which pushes up line costs.

The present invention provides a transmission apparatus for relaying different types of trunk signals which can directly relay exchange trunk signals $S_xt$ and pulse E&M signals Sem without the assistance of a large-sized facility corresponding to a rank exchange.

Figure 1:
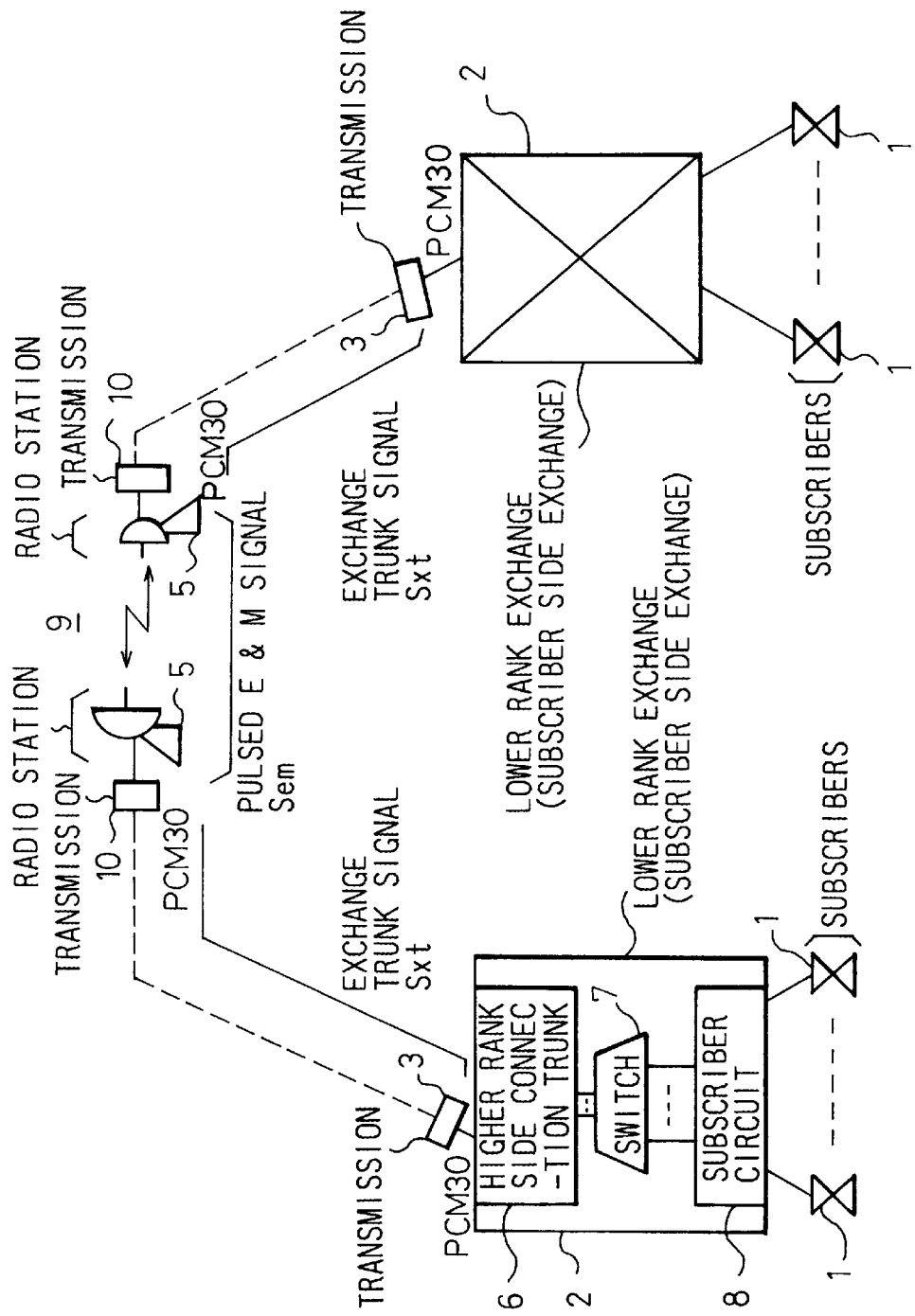
FIG. 1 is a view of an example of the configuration of a telephone network to which the present invention is applied.

FIG. 1 is a view of an example of the configuration of a telephone network to which the present invention is applied. Note that throughout the figures, the same reference numerals or symbols are given to similar constituent elements. In the figure, the transmission apparatuses for relaying different types of trunk signals according to the present invention are shown by reference numerals 10. These have identical configurations and are connected to a pair of radio stations 5 in the figure. The transmission apparatuses 10 are introduced instead of the radio station side transmission apparatuses 4 shown in FIG. 20 and enable realization of direct relaying between exchange trunk signals Sxt and pulse E&M signals Sem using as is the conventional exchange side transmission apparatuses 3 without the higher rank exchanges RC or other large sized facilities corresponding to the same.

Note that transmission apparatuses 10 may be mounted at the each end of a radio transmission line as shown in FIG. 1 or one apparatus may be mounted at only one end. The latter case is for when there is an existing higher rank exchange RC at one end.

Figure 2:
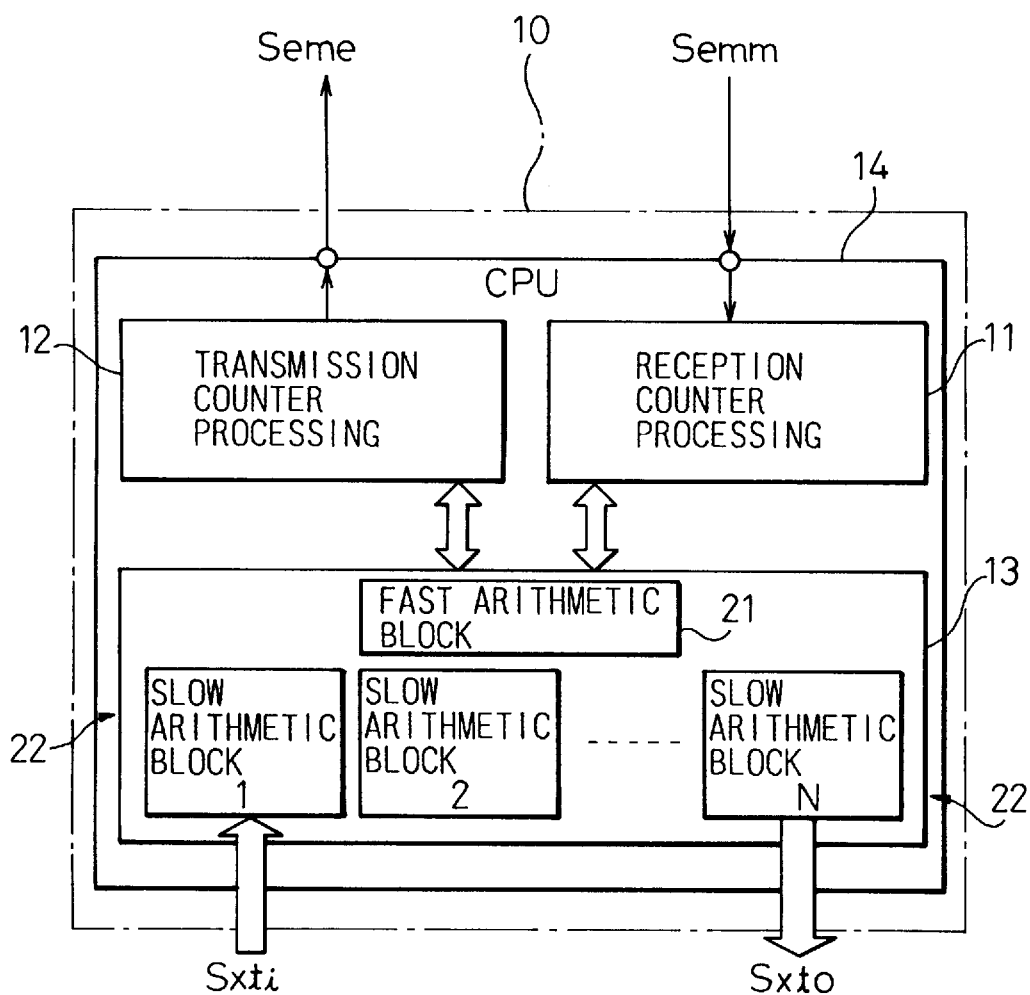
FIG. 2 is a view of the basic configuration of a transmission apparatus according to the present invention.

FIG. 2 is a view of the basic configuration of a transmission apparatus according to the present invention. The apparatus shown in FIG. 2 is a digital transmission apparatus inserted between a pair of exchanges 2 connected to each other through the radio transmission line 9 of FIG. 1. It is a transmission apparatus 10 for directly relaying the exchange trunk signals Sxt input and output at the exchange side and the analog trunk signals Sem transferred in the pulse E&M signal mode on the radio transmission line 9.

The transmission apparatus 10 is comprised of a central processing unit (CPU) 14 comprising a reception counter processing means 11 for receiving a plurality of types of analog trunk signals constituting the pulse E&M signals and defined by various pulse widths and determining the type of the analog trunk signals Sem received by counting the pulse width; a transmission counter processing means 12 for receiving the exchange trunk signals Sxti and transmitting the pulse E&M signals until the pulse width inherent to the analog trunk signals Seme corresponding to the bit format of the signal (Sxto) finishes being counted; and a logical operation unit 13 for generating corresponding exchange trunk signals Sxto based on the results of determination by the reception counter processing means 11 and generating a driving signal for driving the transmission counter processing means 12 based on the input exchange trunk signals Sxti.

Note that the signals Seme represent the signals output from the transmission apparatus 10 to the exchange side as the analog trunk signals Sem, while the signals Semm represents the signals input from the exchange to the transmission apparatus 10. Note that the meaning of the E and M in the pulse E&M signal is reversed between the exchange 2 and the transmission apparatus 10. The terms of E ("ear" or incoming) and M ("mouth" or outgoing) of the pulse E&M signal were established with reference to the exchange.

The signals $S_x$ti represent the signals input from the exchange 2 to the transmission apparatus 10 as the exchange trunk signals, while the signals Sxto represent the signals output toward the exchange 2 from the transmission apparatus 10.

Referring to FIG. 2, more preferably, the logical operation unit 13 is comprised of a fast arithmetic block 21 and slow arithmetic blocks 22. The fast arithmetic block 21 operates when the reception counter processing means 11 and the transmission counter processing means 12 count at least the dial pulses in the analog trunk signals Sem in their minimum count cycle. On the other hand, the slow arithmetic blocks 22 successively execute the operations at the plurality of slow arithmetic blocks (1, 2 . . . N) in a cycle comprised of the minimum count cycle.

The present invention enables the call processing which the higher rank exchange RC had performed in the past in accordance with its own set procedure to be performed by the digital transmission apparatus 10 by introduction of firmware, mostly the central processing unit 14. This firmware discriminates the type of the analog trunk signal to be input or determines the type of the analog trunk signal to be output while maintaining a grasp on the state of transition over time of the exchange trunk signals and the pulse E&M signals (analog trunk signals). The counter processing means 11 and 12 are introduced to realize this discrimination and determination in the firmware. That is, the count values of the counters are used to recognize various pulse widths of the analog trunk signals and conversely produce and send to the exchange side the analog trunk signals of various pulse widths equal to predetermined count values.

Figure 3:
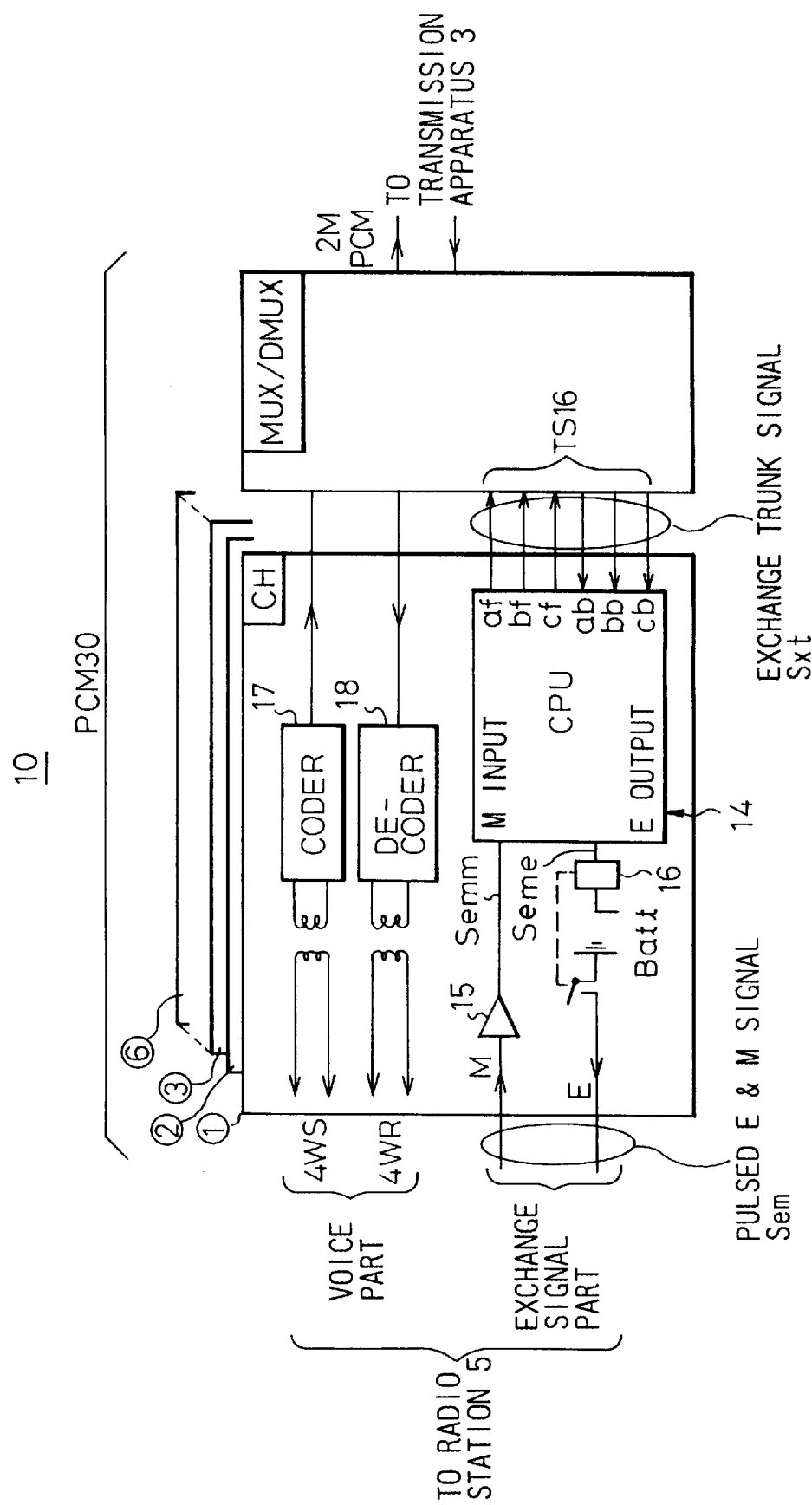
FIG. 3 is a view of an embodiment of a transmission apparatus according to the present invention.

FIG. 3 is a view of an embodiment of a transmission apparatus according to the present invention. In the figure, the transmission apparatus 10 according to the present invention is for example a "PCM30" apparatus which is comprised of a channel board provided in parallel with six channel cards CH each accommodating five channels (total 30 channels) and a multiplex/demultiplex unit MUX/DMUX connected to the channel board through a bus. The multiplex/demultiplex unit MUX/DMUX for example handles 2M bps PCM signals.

The central processing unit (CPU) 14 realized in the present invention performs transfers of digital exchange trunk signals Sxt with the multiplex/demultiplex unit MUX/DMUX and performs transfers of analog pulse E&M signals Sem with the radio station 5. Note that the radio station 5 is provided with an exchange signal part for transfer of the pulse E&M signals and a voice part for transfer of the voice signals. These have conventional configurations (similar to the configuration of CH in FIG. 3) and so further mention will be omitted. The present invention is an invention relating to the signaling signals and mainly relates to the exchange signal part in the figure. The only part of the circuitry shown for the voice part is the coder 17 and the decoder 18.

The central processing unit (CPU) 14 connects to the detection unit 15, for example, the comparator, at the input M, detects if the pulse signal M input from the exchange signal part of the radio station 5 is a ground signal, and applies a signal "1" or "0" in accordance with the same as the analog trunk signal Semm to the input M of the central processing unit (CPU) 14.

On the other hand, the analog trunk signal Seme from the output E of the central processing unit (CPU) 14 energizes a relay 16 and by the opening or closing of the contacts sends out or does not send out the ground level. This is given to the exchange signal part of the radio station 5 as the pulse E signal.

The central processing unit (CPU) 14 is internally comprised by the logical operation configuration shown in FIG. 2. For example, it outputs the 3-bit digital exchange trunk signals $S_x$to comprised of the bits af, bf, and cf and, on the other hand, receives as input the 3-bit digital exchange trunk signals $S_x$ti comprised of the bits ab, bb, and cb. Here, the "f" in af to cf means "forward" and indicates that the information is signaling information sent from the analog side (radio station side) to the digital side (exchange side). On the other hand, the "b" in ab to cb means "backward" and indicates that the information is signaling information sent from the digital side (exchange side) to analog side (radio station side).

Further, the signaling information bits (af to cf and ab to cb) are transferred in a TS16 in the multiplex/demultiplex unit MUX/DMUX. "TS16" is the 16th signaling-use time slot and is disposed between the 30 channels' worth of voice-use time slots TS1 to TS15 and TS17 to TS31.

The transmission apparatus 10 shown in FIG. 3 is sometimes connected to the outgoing (O/G) trunk (OGT) of the exchange 2 and is sometimes connected to the incoming (I/C) trunk (ICT) of the exchange 2. In a typical mode of use, referring to FIG. 1, the O/G use transmission apparatus and I/C use transmission apparatus are interposed between the O/G trunk (or I/C trunk) forming the higher rank side connection trunk in the lower rank exchange 2 at the left side of the figure and the I/C trunk (or O/G trunk) forming the higher rank side connection trunk (not shown) in the lower rank exchange 2 at the right side of the figure so as to make the two trunks cooperate. This will be explained with reference to FIG. 4.

Figure 4:
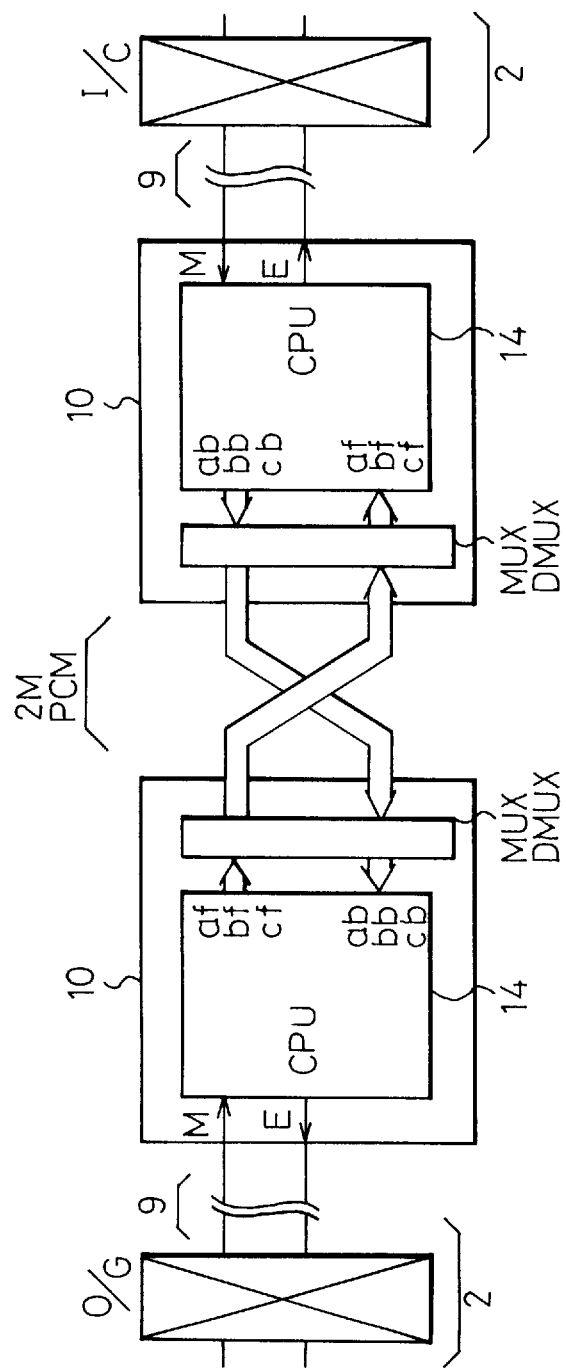
FIG. 4 is a view of a pair of transmission apparatuses connected between an outgoing trunk and an incoming trunk.

FIG. 4 is a view of a pair of transmission apparatuses connected between an outgoing trunk and an incoming trunk. In the figure, the portion at the left half is the transmission apparatus 10 connected to the outgoing trunk OGT side of the exchange 2 and includes the first central processing unit (CPU) 14. The portion at the right half is the transmission apparatus 10 connected to the incoming trunk ICT side of the exchange 2 and includes the second central processing unit (CPU) 14. The OGT side central processing unit (CPU) 14 and the ICT side central processing unit (CPU) 14 operate in association with each other. This is easier to understand by reference to FIG. 4. Note that in FIG. 4, the I/O ports of the ICT side central processing unit (CPU) 14 are represented by af, bf, and cf at the input side and by ab, bb, and cb at the output side, which is opposite to the definitions of "f (forward)" and "b (backward)" given before. This is because the example shown is of use of a central processing unit (CPU) of the same type both for the ICT side central processing unit (CPU) 14 and the OGT side central processing unit (CPU) 14. In this case, the af, bf, and cf at the I/O ports of the ICT side central processing unit (CPU) correspond to the ab, bb, and cb in the I/O ports of the OGT side central processing unit (CPU), while the ab, bb, and cb at the I/O ports of the ICT side central processing unit (CPU) correspond to the af, bf, and cf at the I/O ports of the OGT side central processing unit (CPU). This results in the method of representation of FIG. 4. Note that the digital exchange trunk signals transferred at the center of FIG. 4 will be explained next in brief.

Figure 5:
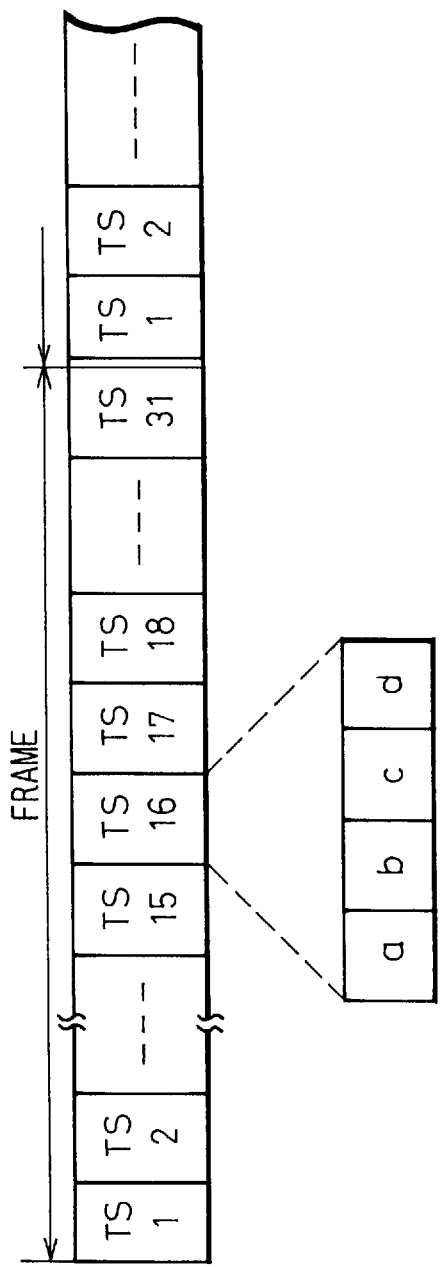
FIG. 5 is a view of an example of the signal mode of trunk signals of a digital exchange.

FIG. 5 is a view of an example of the signal mode of a trunk signal of a digital exchange. The figure shows as an example the signal mode in a transmission system using a PCM30. As mentioned earlier, 15 channels' worth of voice signals are multiplexed by a time division mode in the time slots TS1 to TS15. The remaining 15 channels' worth of voice signals are multiplexed by a time division mode in the time slots TS17 to TS31. This series of time slots constitute one frame of a string of repeated frames.

The time slot in the frame particularly relevant to the present invention is TS16, as mentioned earlier. This signaling-use time slot has a 4-bit format ("abcd"). Three bits "abc" of these were already illustrated in FIG. 3 and FIG. 4. The bit d is a bit for use in a transmission apparatus to which the present invention is scheduled to be applied, but is not relevant to the gist of the present invention. The signaling-use time slot TS16 in the digital exchange trunk signal Sxt will be further explained below.

FIG. 6 is a view showing the correspondence between digital exchange trunk signals and pulse E&M signals. The specific 4-bit formats of the time slot TS16 of the signals $S_{xt}$ are shown under the "TS-16 LINE CODE" at the center of the table. The signal allocations of the figure are in one-to-one correspondence with the configuration of FIG. 4. The 4-bit format TS16 line code is the signal transferred at the 2M bps PCM transmission line (2M PCM) shown at the center of FIG. 4, the "E&M INTERFACE" at the O/G side of FIG. 6 is the signal appearing at the "M" and "E" portions in the apparatus 10 at the left side of FIG. 4, and the "M-DETECTION" and "E-DRIVE" are the output of the detector 15 and the output of the relay 16 shown in FIG. 3.

Similarly, the "E&M INTERFACE" at the I/C side of FIG. 6 is the signal appearing at the "M" and "E" portions in the apparatus 10 at the right side of FIG. 4.

The left column in FIG. 6 shows the classification of the specific analog trunk signals for execution of the protocol in the transmission apparatus 10 to which the present invention is applied. The figure illustrates 16 types of signals from "idle" to "operator recall". The meanings of these signals will be explained later. Note that the meanings of the various symbols used in FIG. 6 are as follows:

(i) The column of "DIRECTION" showing → and ← shows the direction of the flow of the signals. This matches with the direction of the flow of the signals appearing in FIG. 4. For example, the "seized" signal generated at the O/G side is a signal flowing from the O/G side of the left of FIG. 4 to the I/C side at the right of the figure in the same way as the → direction given in FIG. 6.
 (ii) The "40G" or "150G" indicate a ground signal (analog trunk signal) of a pulse width of 40 ms or 150 ms. Further, the "CONTG" shows a continuous ground signal.
 (iii) The portions with just hyphens show so-called open states (non-signal states).
 (iv) In the "TS-16 LINE CODE" column, bits shown by two consecutive bits such as 01 or 10 indicate signals appearing in a pulse manner such as "010" or "101".
 (v) Signals which are underlined indicate changes in logic. For example, looking at the "seized" signal, the underline indicates a change from "1" to "0" of the bit af in the 4 bits (af to df) of the TS-16 line code.
 (v) Looking at the "Clear forward" signal, the *** indication of the TS-16 line code of the I/C trunk side indicates that the signal changes depending on the conditions of the I/C side and is not fixed.

FIG. 7 is a view of the accuracies demanded by signals shown in the correspondence table of FIG. 6. The values showing the pulse time length in FIG. 6, such as 40 or 150, are target values. The allowable ranges (required accuracies) are designated by the users. These are shown in the figure for reference. For example, the "40±5" given for the "seized" signal means that the pulse width of the "seized" signal must be in the range of from 35 ms to 45 ms. That is, it designates the accuracy of the relaying time in direct relaying of different types of trunk signals.

What is learned from FIG. 7 is that there are several portions of overlap between an allowable range of one signal and the allowable range of another signal and that it is sometimes difficult to identify a signal from just the length of the pulse width. For example, the allowable range (140 to 100 ms) of an "end of selection" signal sometimes will completely overlap the allowable range (160 to 120 ms) of the "proceed to send" signal. In the past, the transfer of signaling information was performed in accordance with a predetermined order under autonomous protocol control of the higher rank exchange RC shown in FIG. 20, so even if there was such overlap, it is self evident which of the signals among the two or more overlapping signals was being transferred.

However, separation of two or more overlapping signals is difficult for the transmission apparatus 10 of the present invention as it does not carry out protocol control by the higher rank exchange RC. Therefore, as explained later, the central processing unit (CPU) 14 in the transmission apparatus 10 executes a certain logical operation in consideration of the past history, that is, confirm what step of the protocol the system is currently at, and convert between the analog trunk signals Sem and the digital exchange trunk signals $S_{xt}$. This logical operation can be equivalently expressed by the relay sequence charts (FIG. 10 to FIG. 19). The protocol control will be explained in further detail below.

Figure 9:
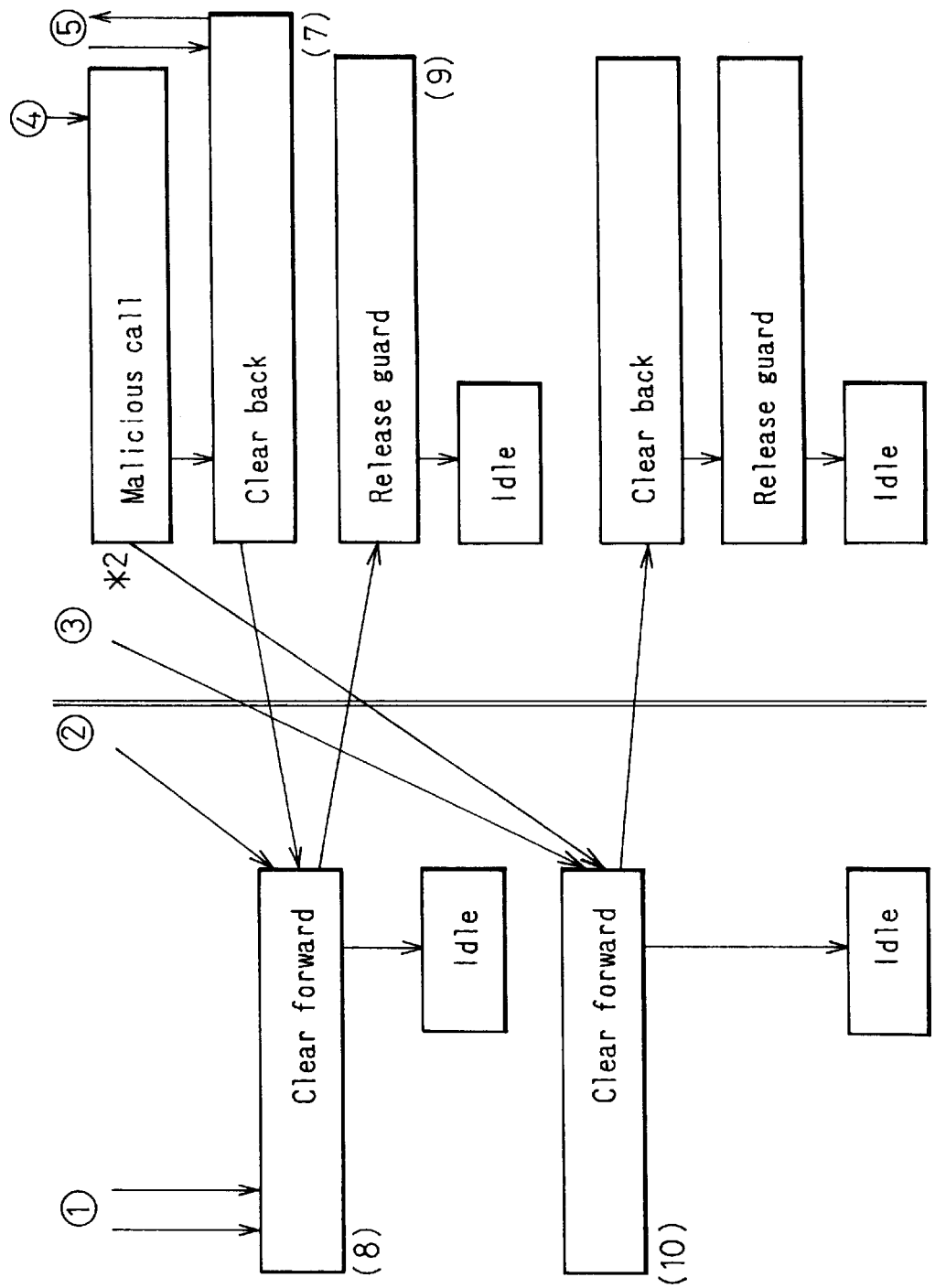
FIG. 9 is a sequence chart (part 2) showing the transfer of various types of signals shown in FIG. 6.

FIG. 8 is a sequence chart (part 1) showing the transfer of various types of signals shown in FIG. 6, while FIG. 9 is part 2 of the same. The positioning of the portions in the sequences in the two figures correspond to the configuration shown in FIG. 4. The "TS16" disposed at the centers of the two figures correspond to the 2M PCM in FIG. 4. The "3-bit format (digital)" disposed at the left and right of the "TS-16" corresponds to the digital inputs and outputs (af to cf and ab to cb) in the central processing units (CPU) 14 at the left and right of FIG. 4, and the "pulse E&M" disposed at the left and right of the "3-bit format (digital)" correspond to the analog inputs and outputs (M, E) in the left and right central processing units (CPU) 14 of FIG. 4.

The boxed portions indicate "states" while the rest indicate "pulses".

(1) When the analog trunk signal is the "idle" signal, the initial state is indicated. There is no pulse E&M signal at this time, as shown in FIG. 6. However, a signal "1001" corresponding to this "idle" state is always flowing on the TS16.

Note that the "blocking" signal at the I/C side is a continuous ground signal for indicating to the O/G side exchange that the I/C side exchange is currently "unusable". It is used for example in cases where the I/C side exchange is shut down for maintenance.

(2) Assume that a "seized" signal is generated at the O/G side. This indicates that a calling subscriber under the O/G side exchange is originating a call (40 ms ground (G) signal). In other words, it indicates the telephone has been taken off the hook. The "seized" signal is then sent to the I/C side (bit af changes to "0"). Note that the I/C side central processing unit (CPU) 14 recognizes the "0001" and "1001" (ab to db) and sends out a 40 ms ground (G) signal as the output E.

(3) Receiving this "seized" signal, the I/C side returns to the O/G side a "seized acknowledge" signal as a response to confirm that it has received the call. This is shown as the "1101" on the TS16. The O/G side central processing unit (CPU) 14 recognizes the "1101" and "0001" and sends out the 150 ms ground (G) signal as the output E.

(4) Receiving the "seized acknowledge" signal or "proceed to selection" signal from the I/C side, the O/G side generates a "DP addressing" signal. The "DP addressing" signal is a so-called dial pulse. Note that when the exchange 2 is an electric motor drive (EMD) exchange resembling a step-by-step exchange, the "proceed to selection" signal is a "dial pulse reception ready" signal output from the EMD exchange.

Note that four states are possible from the "DP addressing" signal. The first is the state ending in a "clear forward" (dialing is performed, but then the phone is immediately placed back on the hook), the second is the state where an "end of selection" signal (special function allowing interruption) is sent back, the third is the state where a "congestion" signal (showing that the line is congested) is sent back, and the fourth is the state where the "answer" signal is sent back.

(5) The O/G side enters the state where the "trunk offering" signal is sent out after generation of the "DP addressing" signal. This signal indicates that a line has been set up with the called subscriber, that is, a required path has been established.

(6) The I/C side generates an "answer" signal, thereby enabling the calling subscriber and the called subscriber to converse.

Note that after the "answer" signal, a "metering" signal (charge pulse signal) is generated. For example, one pulse is issued every three minutes. The initial state is restored (shown by arrow circle in the figure) each time the signal is issued. Note that the *1 in FIG. 8 and the *2 in FIG. 9 show selective use as desired by the user, but these are not relevant to the present invention.

Further, even if an "operator recall" signal (pulse) is generated, the original state is returned to after this. This is a signal among exchanges used for recalling an operator.

The "malicious call" signal of FIG. 9, further, is a signal for instructing that the line not be disconnected even when the calling subscriber hangs up the phone.

(7) The "clear back" signal of the I/C side (back side) is a signal showing that the called subscriber has hung up the phone due to the end of the conversation.

(8) As a result, a "clear forward" signal is generated at the O/G side (forward side) as well. This signal is generated by the calling subscriber hanging up the phone. The O/G side then returns to the initial "idle" state.

(9) If the O/G side first hangs up the phone ("clear forward"), the I/C side generates a "release guard" signal. As a result, the I/C side returns to the initial "idle" state. Note that the "release guard" signal is for rejecting the receipt of a new call during the processing for opening the lines.

(10) The O/G side sometimes issues a "clear forward" signal due to factors other than the calling subscriber hanging up. First, there is the case of receipt of an "answer" signal from the I/C side. Second, there is the receipt of a "malicious call" signal from the I/C side. As a result, the O/G side returns to the initial "idle" state and the I/C side returns to the initial "idle" state through the "clear back" and "release guard" signals.

Figure 10:
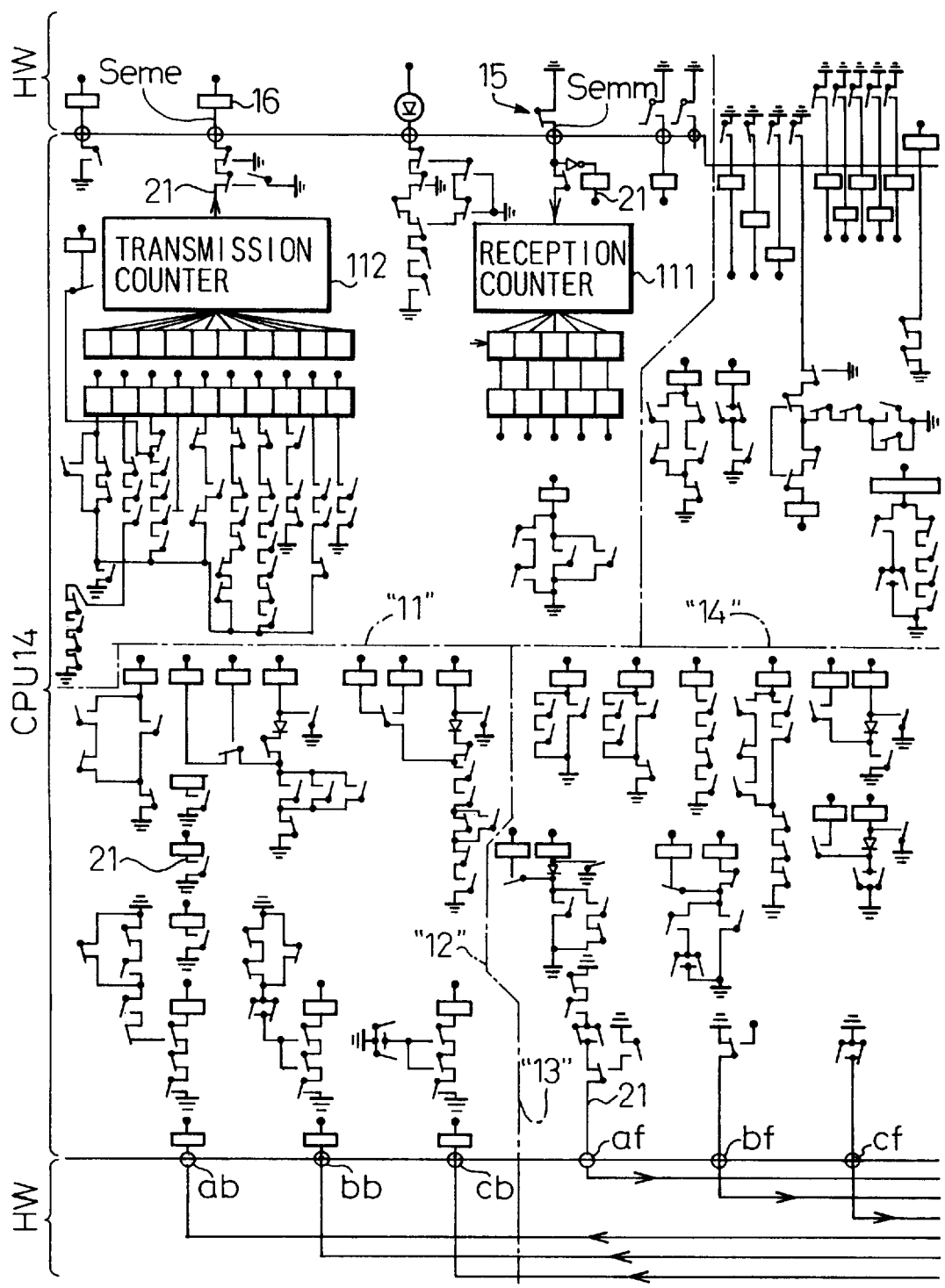
FIG. 10 is a detailed view of the overall configuration of an outgoing trunk side transmission apparatus.

FIG. 10 is a detailed view of the overall configuration of an outgoing trunk side transmission apparatus. In the figure, the range of the "CPU 14" shown at the left end corresponds to the central processing unit 14, while the "HW" (at top and bottom of figure) indicate the portions corresponding to the hardware cooperating with the central processing unit (CPU) 14. These together form one piece of firmware.

In the hardware "HW" at the top, the input side analog trunk signal Semm (input M) and output side analog trunk signal Seme (output E) etc. are shown. In the hardware "HW" at the bottom, the bits af to cf and the bits ab to cb forming the digital exchange trunk signals are shown.

In the figure, the center "CPU 14" actually operates based on processing of a program, but is shown by an equivalent relay sequence chart (same below for following figures). This enables the logical arithmetic operation for executing the conversion between the signals Sem and signals Sxt to be visually understood.

Comparing the portion of the "CPU 14" in FIG. 10 with the block shown in FIG. 2, the reception counter processing means 11 of FIG. 2 is comprised basically of the reception counter 111 of FIG. 10 and the transmission counter processing means 12 of FIG. 2 is comprised mainly of the transmission counter 112 of FIG. 10.

Further, the fast arithmetic block 21 shown in FIG. 2 is shown by the processing route 21 expressed by the bold line in FIG. 10. The slow arithmetic blocks 22 shown in FIG. 2 correspond to all processing routes other than the bold processing route.

Figure 11:
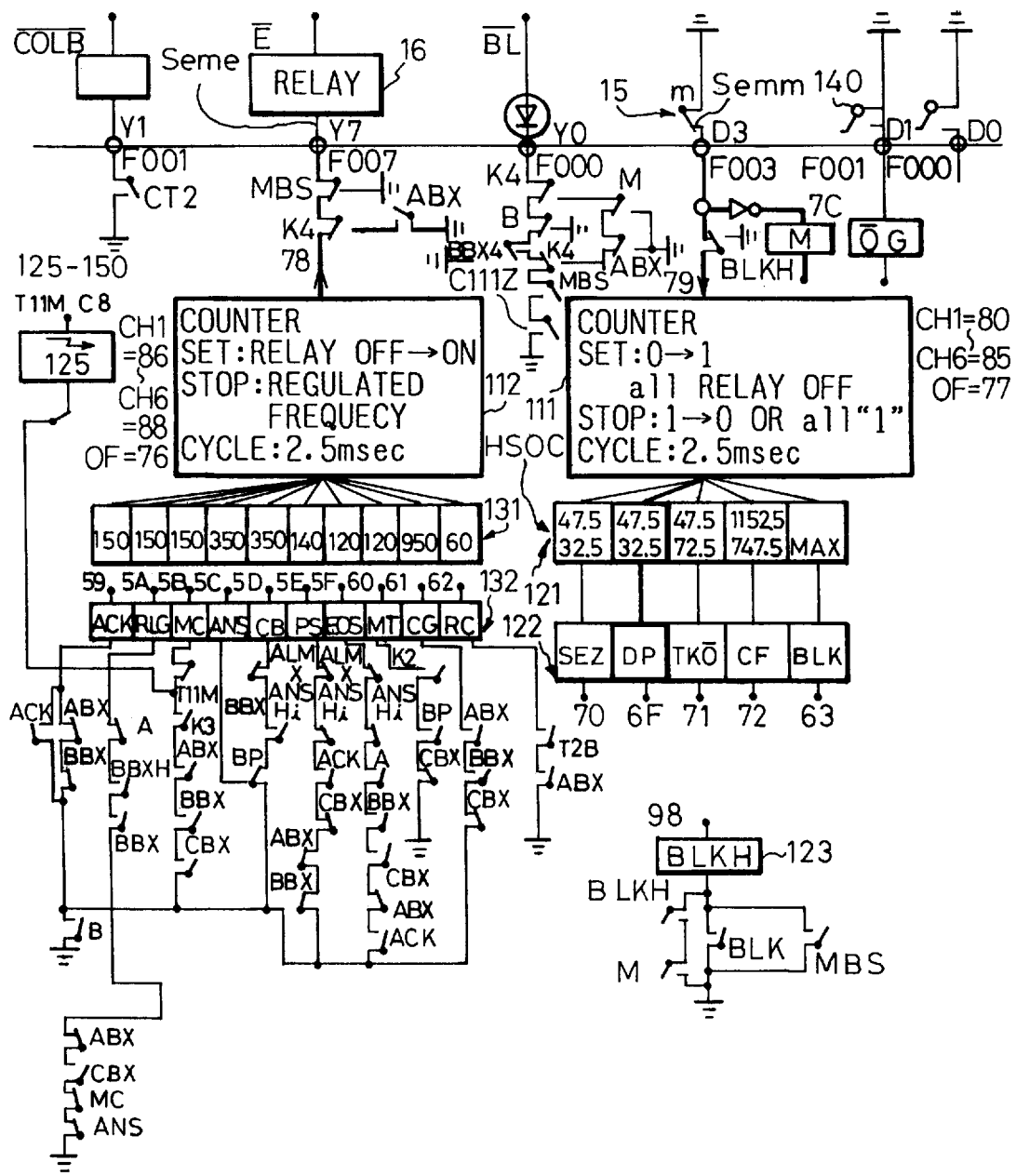
FIG. 11 is an enlarged view of the region enclosed by the dot-dash line "11" in FIG. 10.
Figure 12:
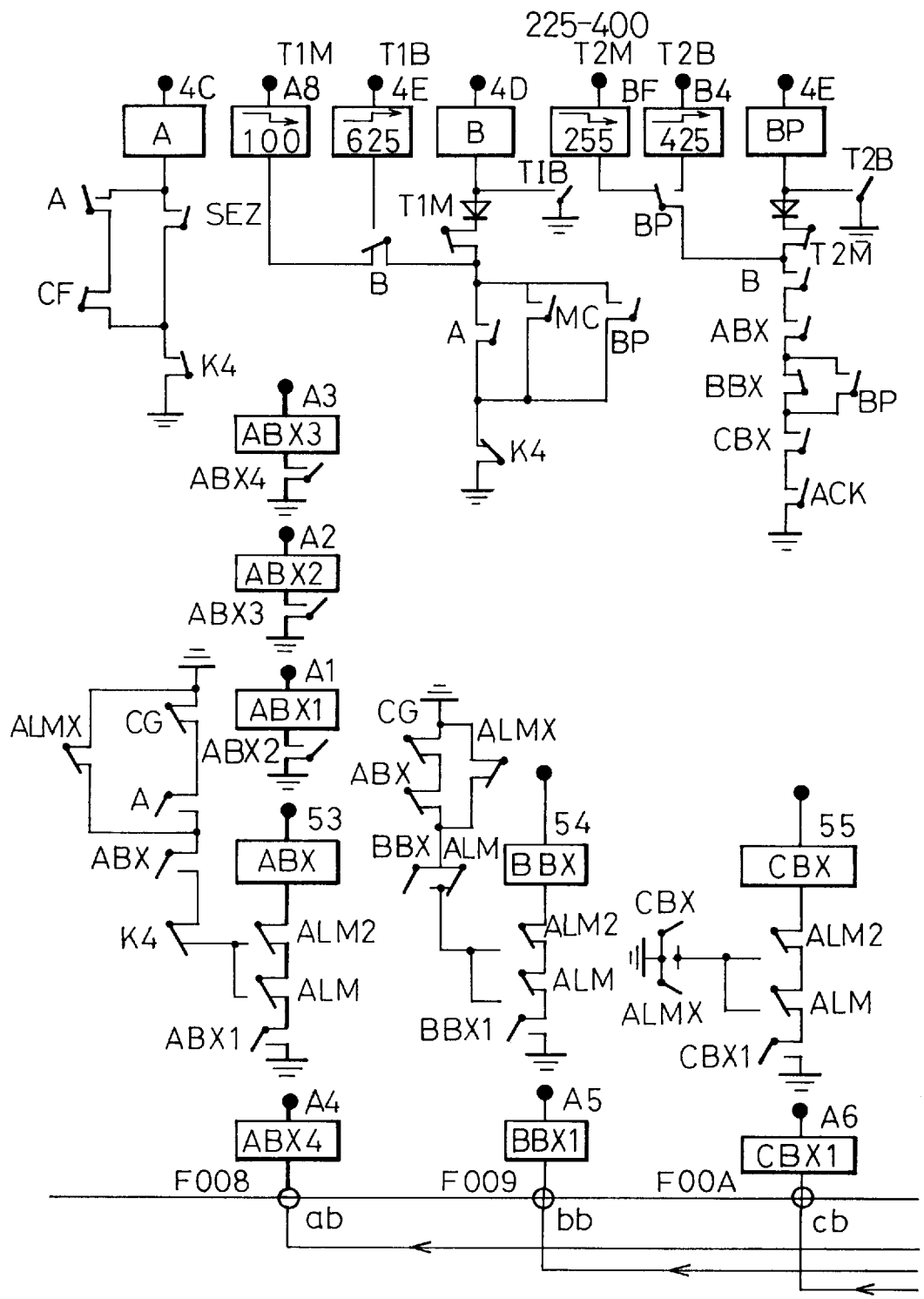
FIG. 12 is an enlarged view of the region enclosed by the dot-dash line "12" in FIG. 10.
Figure 13:
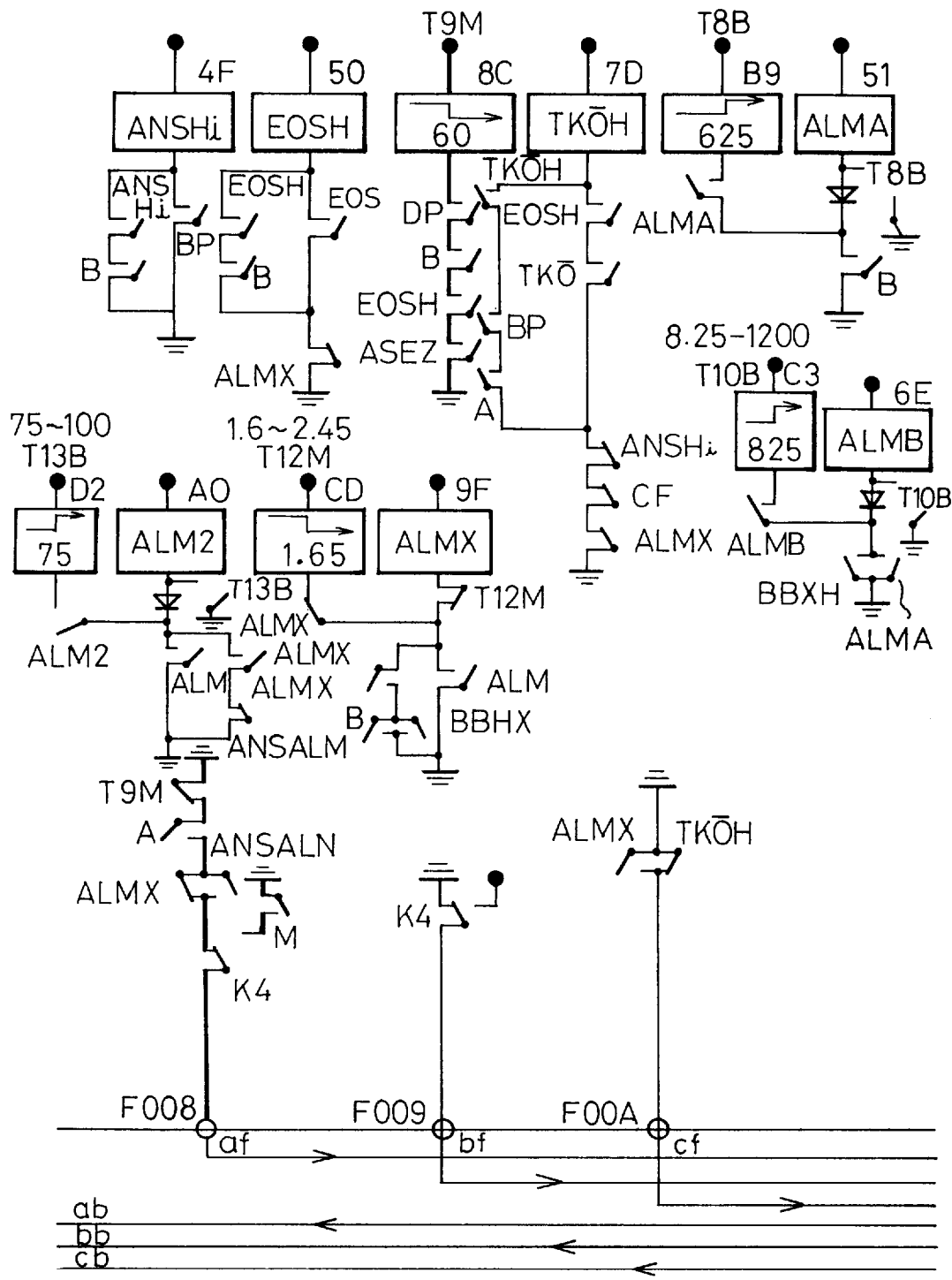
FIG. 13 is an enlarged view of the region enclosed by the dot-dash line "13" in FIG. 10.
Figure 14:
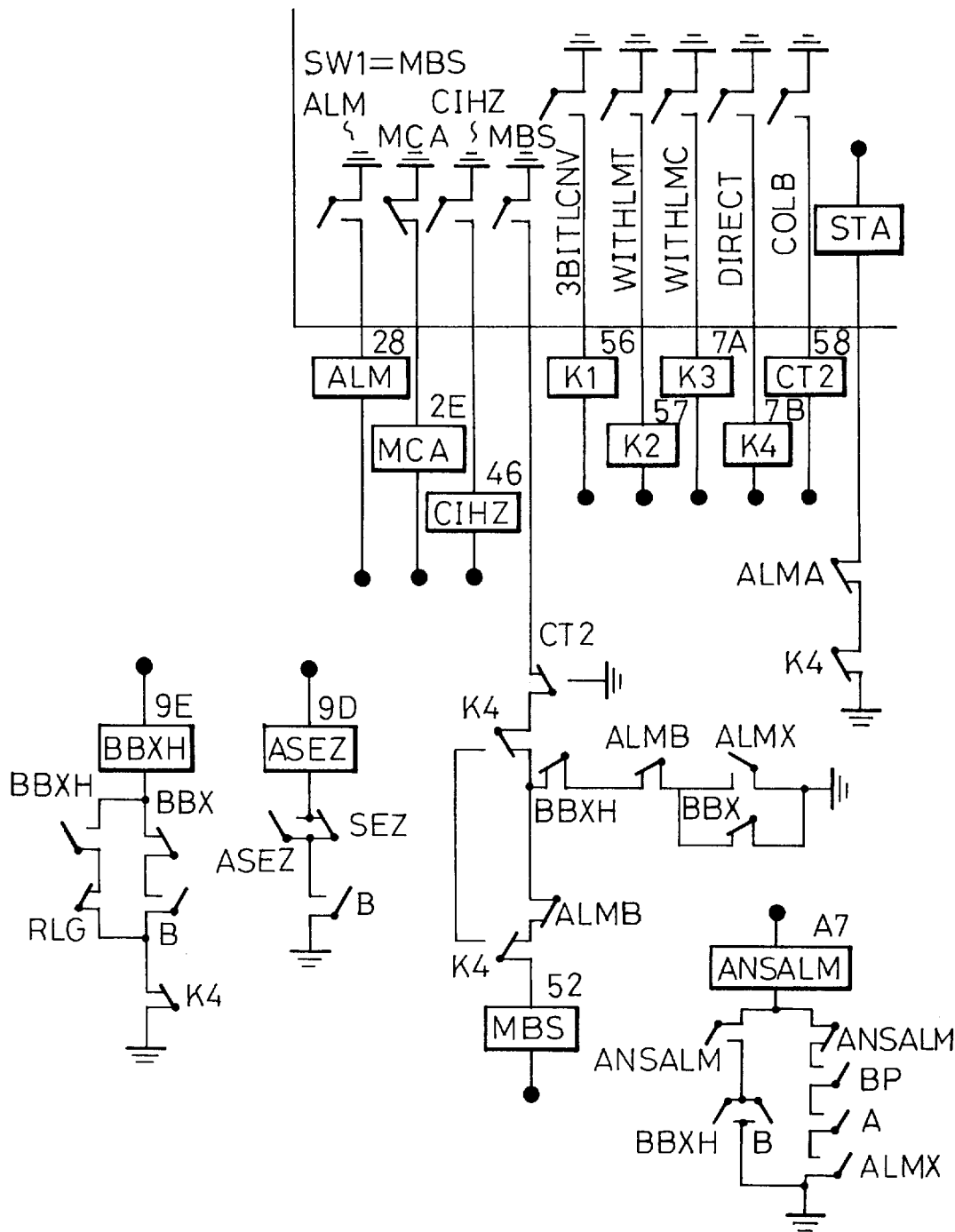
FIG. 14 is an enlarged view of the region enclosed by the dot-dash line "14" in FIG. 10.

FIG. 11 is an enlarged view of the region enclosed by the dot-dash line "11" in FIG. 10; FIG. 12 is an enlarged view of the region enclosed by the dot-dash line "12" in FIG. 10; FIG. 13 is an enlarged view of the region enclosed by the dot-dash line "13" in FIG. 10; and FIG. 14 is an enlarged view of the region enclosed by the dot-dash line "14" in FIG. 10. In FIG. 11, the reception counter 111 is set when the signal Semm changes from the logic "0" to "1" and thereupon commences the count operation. At the time of setting, it turns off (OFF) all relays illustrated for initialization. The smallest count cycle (CYCLE) of the counter operation is for example 2.5 ms. That is, while Semm is "1", this "1" pulse is sampled at 2.5 ms intervals and the pulse width detected. Reference numeral 121 in the figure shows the various types of converters. When it is detected that the pulse width is for example 47.5 to 32.5 ms, it is determined that the previously mentioned "seized" signal has been input and the corresponding relay "SEZ" (seized) in the relay group 122 is driven. Note that a black dot in the figure shows a power supply. Further, the other relays "DP", "TKO", "CF", and "BLK" in the relay group 122 are excited and turn on the corresponding contacts when receiving the previously mentioned "DP addressing", "trunk offering", "clear forward", and "block" signals respectively.

The reception counter 111 stops its count operation when the signal Semm changes from the logic "1" to "0" or the count value becomes all "1".

Note that the "blocking" signal is a continuous ground signal and is completely different from the other pulse-like signals, so separate processing is required. In FIG. 11, when the signal Semm transfers the "blocking" signal, the comparator 121 shows MAX or more anyway. Due to this, the relay "BLK" in the relay group 122 is excited. In accordance with this, the relay contacts BLK (shown at bottom right in FIG. 11) become on and the relay "BLKH" 123 is excited. Due to this, the contacts BLKH at the bottom left of the relay 123 become on, while the relay contacts BLKH shown at the top right of FIG. 11 (directly above counter 111) become off. By becoming off, the count operation of the counter 111 is stopped. The count operation is started when the "blocking" signal is released. In this case, looking at the relay M at the top right in FIG. 11, due to the arrival of the continuous ground signal, the relay contacts M (bottom left of relay 123) are closed. The relay (BLKH) 123 is excited first and the relay contacts BLKH become on. Along with this, the relay 123 holds its state. That is, the count operation of the counter 111 remains stopped.

Here, when the "blocking" signal is released, the relay M at the top right in the figure is deenergized, while the relay contacts M at the bottom right in the figure become off and the relay (BLKH) 123 is deenergized. Due to this, the self-hold state is released and the relay contacts BLKH directly above the counter 111 once again become on and so the counter 111 resumes its count operation.

In the end, when a "blocking" signal comprised of a continuous ground signal is received and the count value of the reception counter processing means 11 exceeds the limit count value, the operation of the reception counter processing means 11 is made to stop. The reception counter processing means 11 is activated once again when the "blocking" signal is released.

Next, looking at the transmission counter 112, the transmission counter 112 continues outputting the signal Seme of the logic "1" until a time corresponding to the pulse width specified by one of the registers in the group of registers 131 finishes being counted. For example, when the register "150" in the register group 131 is selected, the counter continues outputting the signal Seme until 150 ms/2.5 ms (corresponding to "REGULATED FREQUENCY" in figure) finishes being counted. Note that 2.5 ms shows the minimum count cycle in the same way as with the counter 111. Note that the counter 112 is set (count is started) when the relay is switched from off to on. The relay is shown as the relay group 132 in the figure. The relay "ACK" among these, for example, is excited by the detection of the "seized acknowledge" signal shown in FIG. 6. Similarly, the relay "RLG" is excited by the detection of the "release guard" signal and the relay "MC" is excited by the detection of the "malicious call" signal (and so on).

FIG. 12 shows the processing of the input bits ab to cb, while FIG. 13 shows the processing for the output bits af to cf. The top of FIG. 14 is the input part by which a user at a console inputs commands and is not too relevant to the gist of the present invention.

Figure 15:
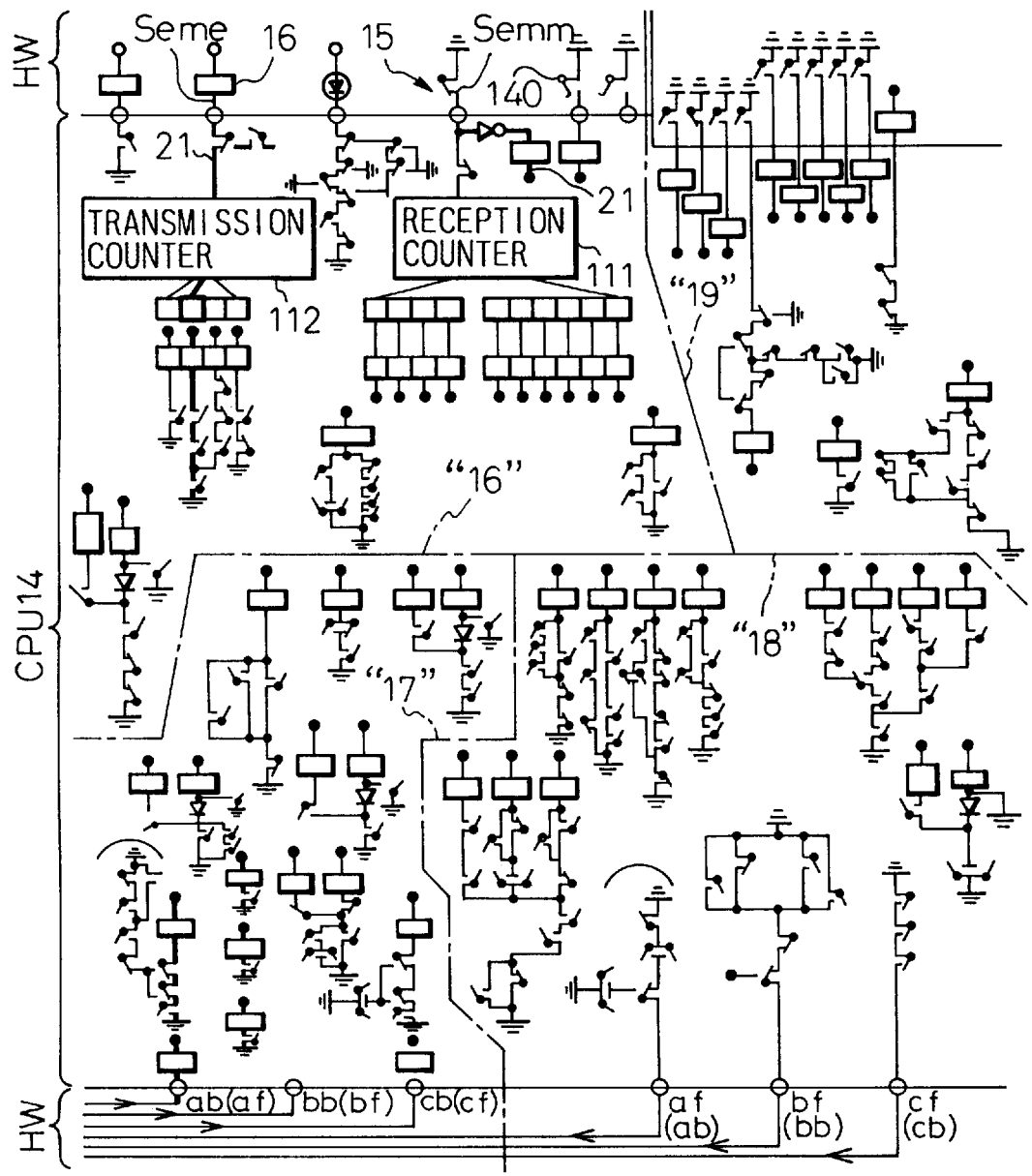
FIG. 15 is a detailed view of the overall configuration of an incoming trunk side transmission apparatus.
Figure 16:
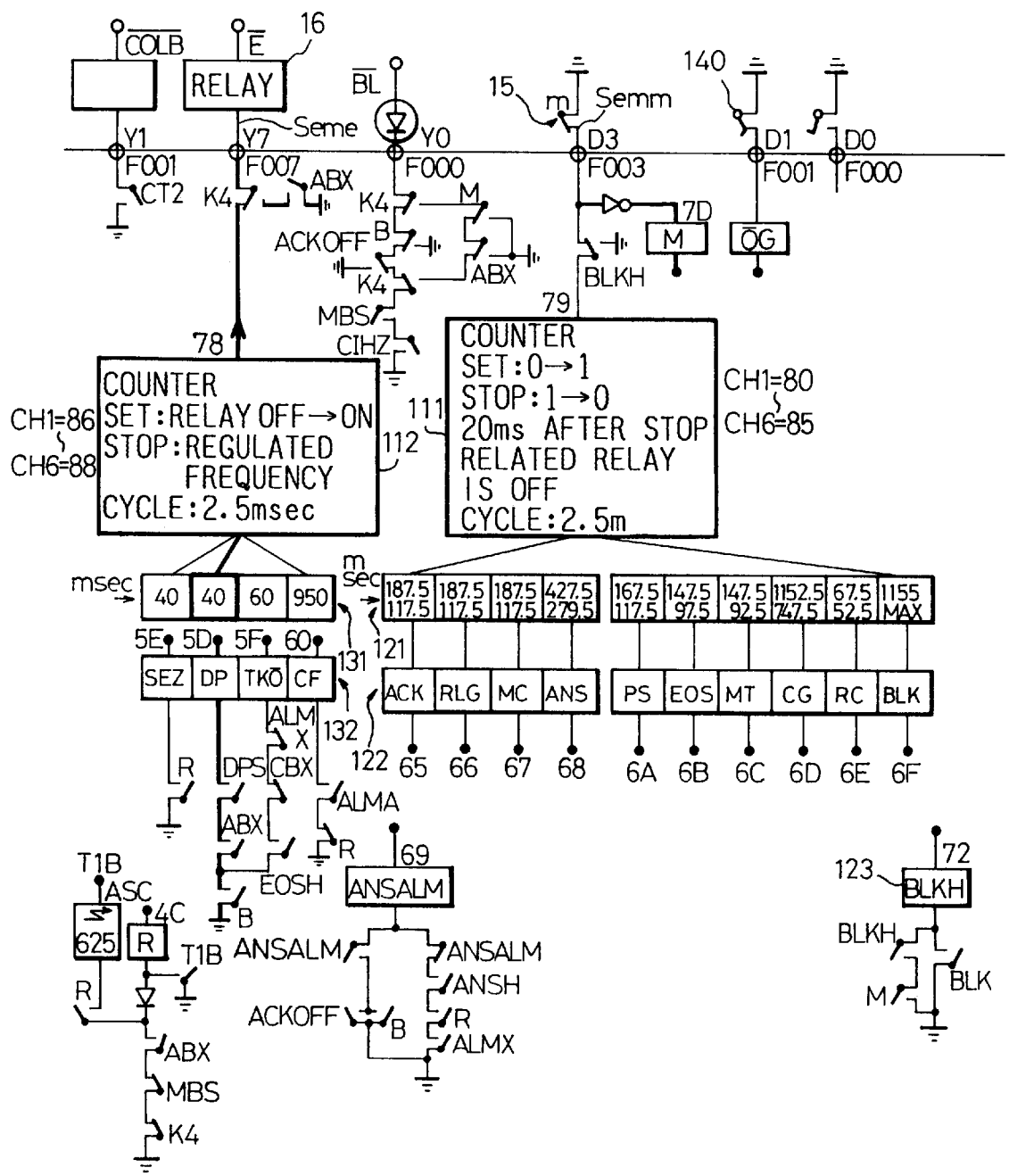
FIG. 16 is an enlarged view of the region enclosed by the dot-dash line "16" in FIG. 15.

FIG. 15 is a detailed view of the overall configuration of an incoming trunk side transmission apparatus. The figure corresponds to FIG. 10. The two are substantially equivalent. The first (O/G side) transmission apparatus 10 comprised including the first (O/G side) central processing unit (CPU) 14 and connected to the OGT side of the exchange 2 and the second (I/C side) transmission apparatus 10 comprised including the second (I/C side) central processing unit (CPU) 14 and connected to the ICT side of the exchange preferably have first and second central processing units formed by common-use central processing units of identical configurations. Each common-use central processing unit is provided with a switch terminal 140. The switch terminal 140 of the side first receiving the "seized" signal as the exchange trunk signal is set to the OGT side and causes the unit to operate as the first (O/G side) central processing unit. The other switch terminal 140 is set to the ICT side and causes the unit to operate as the second central processing unit. In this way, so-called "both way" trunks are realized.

Figure 17:
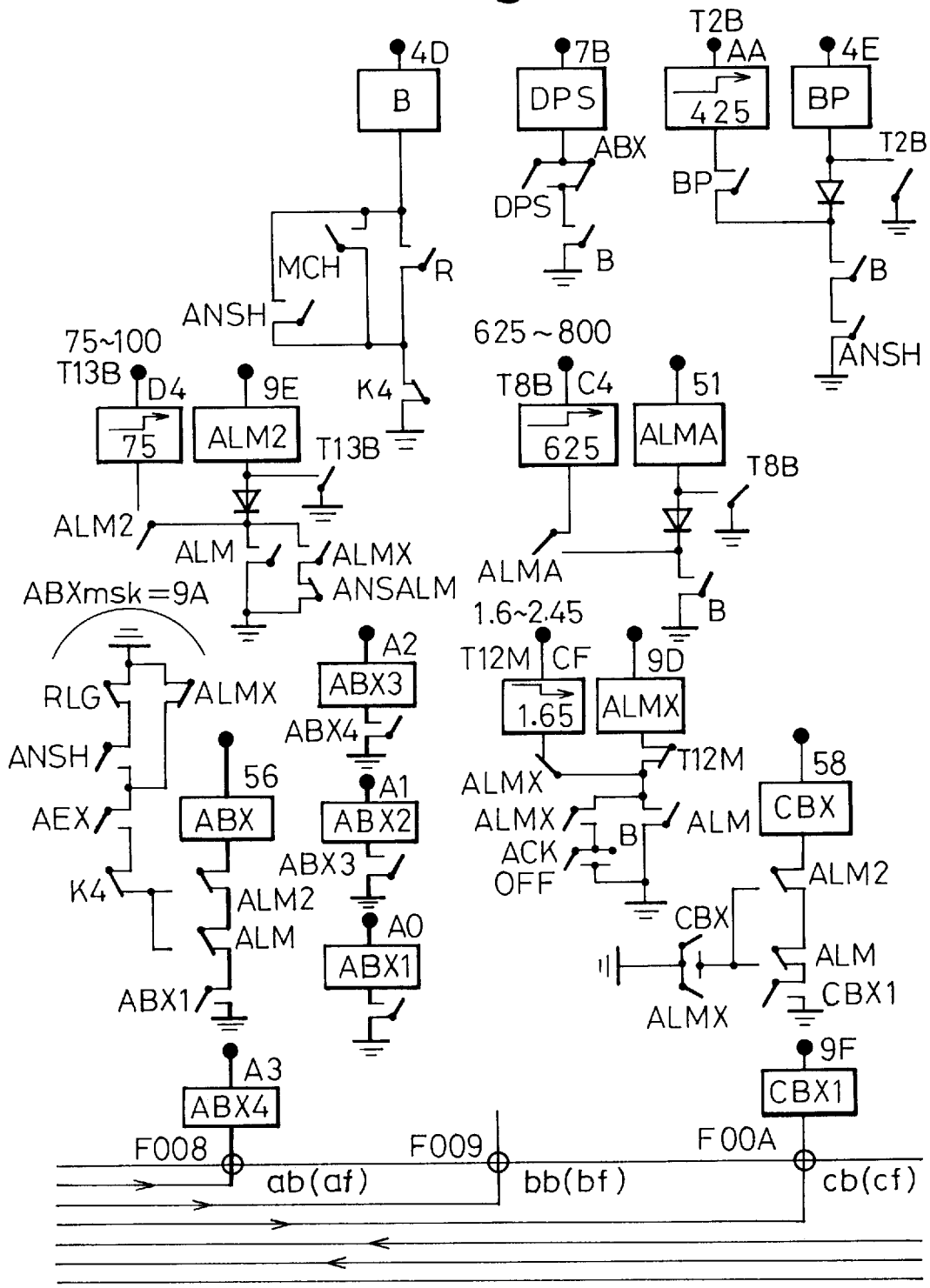
FIG. 17 is an enlarged view of the region enclosed by the dot-dash line "17" in FIG. 15.
Figure 18:
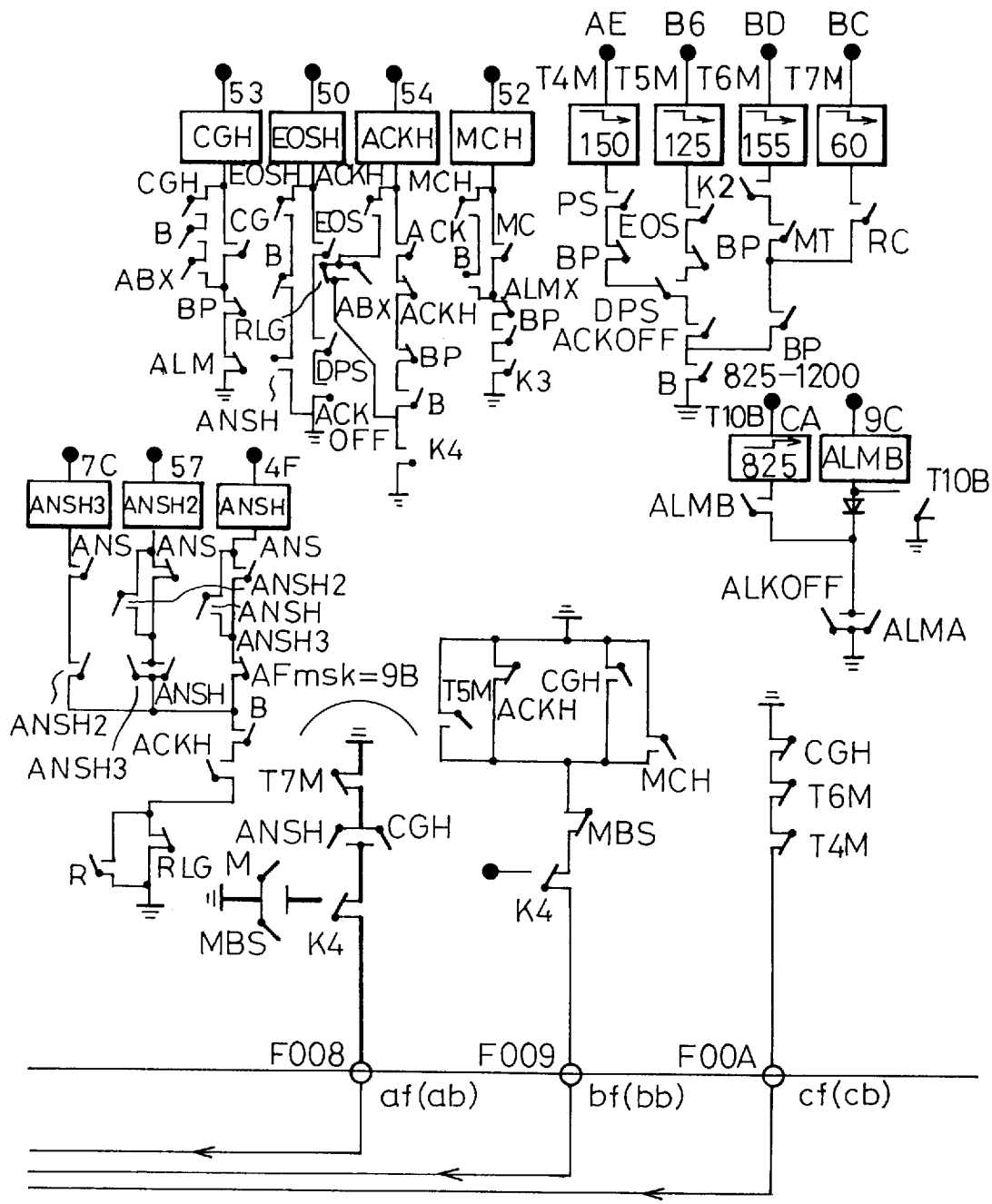
FIG. 18 is an enlarged view of the region enclosed by the dot-dash line "18" in FIG. 15.
Figure 19:
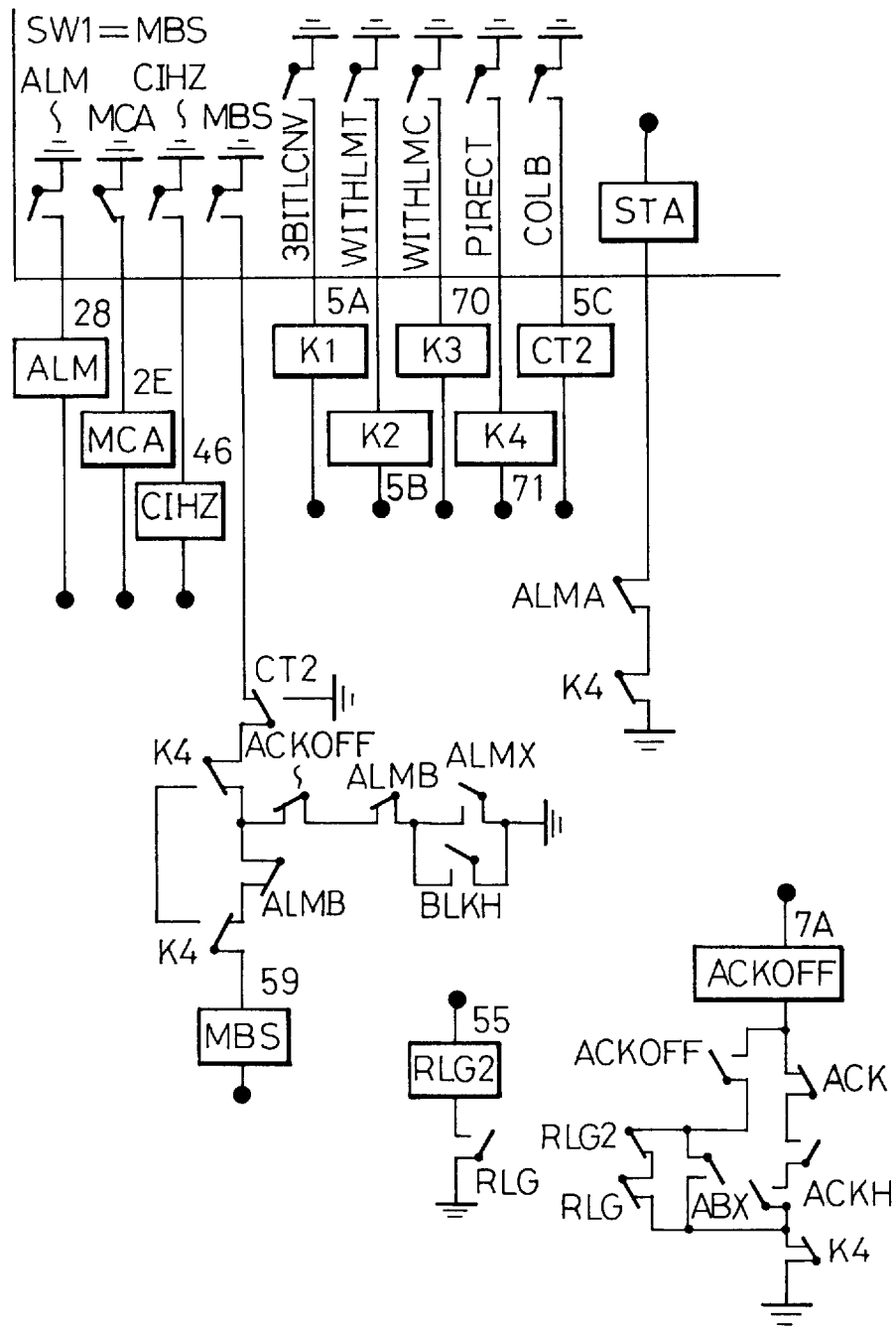
FIG. 19 is an enlarged view of the region enclosed by the dot-dash line "19" in FIG. 15.

Note that in the same way as in FIGS. 11 to 14, FIG. 16 is an enlarged view of the region enclosed by the dot-dash line "16" in FIG. 15, FIG. 17 is an enlarged view of the region enclosed by the dot-dash line "17" in FIG. 15, FIG. 18 is an enlarged view of the region enclosed by the dot-dash line "18" in FIG. 15, and FIG. 19 is an enlarged view of the region enclosed by the dot-dash line "19" in FIG. 15.

As explained above, according to the present invention, it is possible to realize a function equivalent to that of a higher rank exchange RC by a digital transmission apparatus 4 when there is no higher rank exchange RC by some simple modifications of the firmware of the existing digital transmission apparatus 4.

I claim:

1. A transmission apparatus, for relaying different types of trunks signals, said transmission apparatus inserted between a first exchange and a radio transmission line coupled to a second exchange, said transmission apparatus directly relaying input and output exchange trunk signals with the first exchange and communicating with the radio transmission line by analog trunk signals transferred in the form of pulse ear and mouth signals, said transmission apparatus comprising:

a first central processing unit including:

a reception counter processing means for receiving a plurality of types of analog trunk signals defined by various pulse widths and for determining the type of each analog trunk signal received by measuring the pulse width of the analog trunk signal, a transmission counter processing means for receiving exchange trunk signals and transmitting the pulse ear and mouth signals until the pulse width inherent to one of the analog trunk signals corresponding to a bit format finishes being measured, and a logical operation unit for generating a corresponding exchange trunk signal based on results of determination by the reception counter processing means and for generating a driving signal for driving the transmission counter processing means based on an input exchange trunk signal.

2. A transmission apparatus for relaying different types of trunk signals as set forth in claim 1, wherein the logical operation unit includes a fast arithmetic block and a plurality of slow arithmetic blocks, the fast arithmetic block operates when the reception counter processing means and the transmission counter processing means achieve sampling and counting, respectively, at least dial pulses in the analog trunk signals with a minimum count cycle, and the slow arithmetic blocks successively execute the operations at the plurality of slow arithmetic blocks in a cycle comprised of a plurality of the minimum count cycles.

3. A transmission apparatus for relaying different types of trunk signals as set forth in claim 2, wherein said transmission apparatus is connected to an outgoing trunk side of one of the first and second exchanges.

4. A transmission apparatus for relaying different types of trunk signals as set forth in claim 2, wherein said transmission apparatus is connected to an incoming trunk side of one of the first and second exchanges and further comprising a second central processing unit.

5. A transmission apparatus for relaying different types of trunk signals as set forth in claim 2, wherein the first central processing unit is connected to an outgoing trunk side of one of the first and second exchanges, and wherein said transmission apparatus further comprises a second central processing unit connected to an incoming trunk side of one of the first and second exchanges, the first and second central processing units formed by common-use central processing units having an identical configuration, and the common-use central processing units being provided with switch terminals, the switch terminal first receiving a seized signal as an exchange trunk signal being set to the outgoing trunk side and causing operation as the first central processing unit and the other switch terminal being set to the incoming trunk side and causing operation as the second central processing unit.

6. A transmission apparatus for relaying different types of trunk signals as set forth in claim 2, wherein when a blocking signal comprised of a continuous ground signal is received and the count value of the reception counter processing means exceeds a limit count value, the operation of the reception counter processing means is made to stop and when the blocking signal is released, the reception counter processing means is activated once again.

7. A transmission apparatus for relaying different types of trunk signals, comprising:

a central processing unit including:

a reception counter unit receiving a plurality of types of analog trunk signals constituting pulse ear and mouth signals and defined by various pulse widths and determining the type of each analog trunk signal received by measuring the pulse width, a transmission counter unit receiving exchange trunk signals and transmitting the pulse ear and mouth signals until the pulse width inherent to the analog trunk signal corresponding to a bit format finishes being measured, and a logical operation unit generating a corresponding exchange trunk signal based on the determination of the reception counter unit and generating a driving signal to drive the transmission counter unit based on the exchange trunk signals.

8. A system, comprising:

a first exchange;

a second exchange; and a transmission apparatus which receives input/output exchange trunk signals from said first exchange and converts said exchange trunk signals to analog trunk signals which are relayed in an electromagnetic medium to said second exchange by measuring the pulse width of the analog trunk signals in order to recognize the analog trunk signals.

\* \* \* \* \*

UNITED STATES PATENT AND TRADEMARK OFFICE
CERTIFICATE OF CORRECTION

PATENT NO.: 5,875,244
DATED : February 23, 1999
INVENTOR(S): Takashi NAGATO

It is certified that error appears in the above-identified patent and that said Letters Patent is hereby corrected as shown below:

Col. 1, line 47, change "$(S_{x1})$" to --(Sx1)--;
line 48, change "$(Se_m)$" to --(Sem)--;
line 51, change "$S_{xt}$" to --Sxt-- and change "$Se_m$" to --Sem--;
line 63, change "$(S_xt)$" to --(Sxt)--;
line 64, change "$Se_m$" to --Sem--.

Col. 2, line 4, change "$S_{xt}$" to --Sxt-- and change "$Se_m$" to --Sem--;
line 10, change "$S_xt$" to --Sxt--;
line 11, change "$S_{xt}$" to --Sxt--;
line 14, change "$S_xt$" to --Sxt--.

Col. 3, line 46, change "$S_{xt}$" to --Sxt--;
line 57, change "$S_xt$" to --Sxt--;
line 58, change "$Se_m$" to --Sem--;
line 61, change "$S_xt$" to --Sxt--.

UNITED STATES PATENT AND TRADEMARK OFFICE
CERTIFICATE OF CORRECTION

PATENT NO.:   5,875,244
DATED     :   February 23, 1999
INVENTOR(S):  Takashi NAGATO It is certified that error appears in the above-identified patent and that said Letters Patent is hereby corrected as shown below:

Col. 4,   line 3, change "$S_x t$" to --Sxt--;
          line 47, change "(Sxto)" to --(Sxti)--;
          line 63, change "$S_x ti$" to --Sxti--.

Col. 6,   line 1, change "$S_x to$" to --Sxto--;
          line 3, change "$S_x ti$" to --Sxti--.

Col. 8,   line 21, change "$S_{xt}$" to --Sxt--.

Signed and Sealed this

Twenty-eighth Day of September, 1999

Attest:

Q. TODD DICKINSON

*Attesting Officer*       *Acting Commissioner of Patents and Trademarks*